(12) United States Patent
Bennett

(10) Patent No.: US 12,042,812 B2
(45) Date of Patent: Jul. 23, 2024

(54) SEALING ADAPTER FOR DISPOSABLE PRIMING TIP OF AUTOMATED GLASS PRIMING DEVICE

(71) Applicant: Magna Mirrors of America, Inc., Holland, MI (US)

(72) Inventor: Daniel K. Bennett, Jenison, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 30 days.

(21) Appl. No.: 17/449,500

(22) Filed: Sep. 30, 2021

(65) Prior Publication Data

US 2022/0105534 A1    Apr. 7, 2022

Related U.S. Application Data

(60) Provisional application No. 63/198,195, filed on Oct. 2, 2020.

(51) Int. Cl.
| | |
|---|---|
| *B05C 1/02* | (2006.01) |
| *B05C 11/10* | (2006.01) |
| *B05D 1/28* | (2006.01) |
| *B05D 5/10* | (2006.01) |
| *C03C 17/00* | (2006.01) |

(52) U.S. Cl.
CPC .......... *B05C 1/025* (2013.01); *B05C 11/1002* (2013.01); *B05D 1/28* (2013.01); *B05D 5/10* (2013.01); *C03C 17/002* (2013.01); *C03C 2218/114* (2013.01)

(58) Field of Classification Search
CPC .. B05C 1/02; B05C 1/025; B05D 5/10; B67D 1/0462; B67D 1/00; B67D 7/0255; B67D 7/0216
USPC .............................................. 222/92
See application file for complete search history.

(56) References Cited

U.S. PATENT DOCUMENTS

| | | | | |
|---|---|---|---|---|
| 4,932,094 | A | * | 6/1990 | McCowin ............. B05C 17/015 222/387 |
| 5,131,349 | A | * | 7/1992 | Keller .................... B05C 1/027 401/86 |
| 5,551,197 | A | | 9/1996 | Repp et al. |
| 5,853,895 | A | | 12/1998 | Lewno |
| 6,220,650 | B1 | | 4/2001 | Davis et al. |
| 10,023,026 | B2 | | 7/2018 | Snider et al. |
| 10,807,445 | B2 | | 10/2020 | Tooker et al. |
| 10,843,215 | B1 | | 11/2020 | Douma et al. |

(Continued)

*Primary Examiner* — Karl Kurple
(74) *Attorney, Agent, or Firm* — HONIGMAN LLP

(57) ABSTRACT

A system for automatically dispensing a fluid from a deformable container onto a panel includes a primer head having a container receiver and a container deformer, the container receiver receiving and holding a container of primer thereat. An adapter is received into an opening of the container and is secured to a portion of the primer head, and the container is retained at the container receiver of the primer head. A primer tip is disposed at the adapter. With the container held at the container receiver and retained at the primer head, the primer head moves to position the primer tip at the panel. When the primer tip is positioned at the panel, the container deformer automatically operates to deform the container to cause a predetermined amount of primer to be dispensed from the container, through the adapter and to the primer tip and onto the panel.

21 Claims, 28 Drawing Sheets

(56) References Cited

U.S. PATENT DOCUMENTS

| | | | | |
|---|---|---|---|---|
| 2003/0044219 A1* | 3/2003 | Quintero | ............... | B05C 17/002 |
| | | | | 222/386 |
| 2004/0188001 A1* | 9/2004 | Okuda | ................. | B29C 48/155 |
| | | | | 264/46.4 |
| 2004/0226968 A1* | 11/2004 | Lafond | ................. | B05C 17/015 |
| | | | | 222/327 |
| 2011/0006076 A1* | 1/2011 | Williams | .......... | B05C 17/00583 |
| | | | | 222/391 |
| 2011/0179995 A1* | 7/2011 | Chang | ................... | B05C 5/0216 |
| | | | | 118/500 |
| 2013/0108797 A1* | 5/2013 | Rapin | ................... | B05C 5/0216 |
| | | | | 118/264 |
| 2014/0332567 A1* | 11/2014 | Geiger | ................. | B65D 47/18 |
| | | | | 222/420 |
| 2016/0045928 A1* | 2/2016 | Frey | ..................... | B05C 17/015 |
| | | | | 222/94 |

\* cited by examiner

STEP 1: ROBOT PUTS TOOL IN TIP REMOVAL POSITION

FIG. 7   STEP 2: AIR SLIDE RETRACT TO REMOVE TIP

STEP 4: AIR SLIDE EXTEND TO PRESS TIP ONTO TOOL. AIR SIDE WILL NOT TRAVEL FULL STROKE, THE TIP BEING SEATED WILL STOP THE TRAVEL MID STROKE.

STEP 6A: TIP SHUTTLE EXTENDS TO REMOVE BLADE FROM UNDER TIP.

STEP 6A: TIP SHUTTLE EXTENDS TO REMOVE BLADE FROM UNDER TIP.

STEP 7: WITH TIP SHUTTLE EXTENDED THE TIP CYLINDER CAN RETRACT TO ALLOW THE ROBOT TO EXIT THE TIP CHANGER

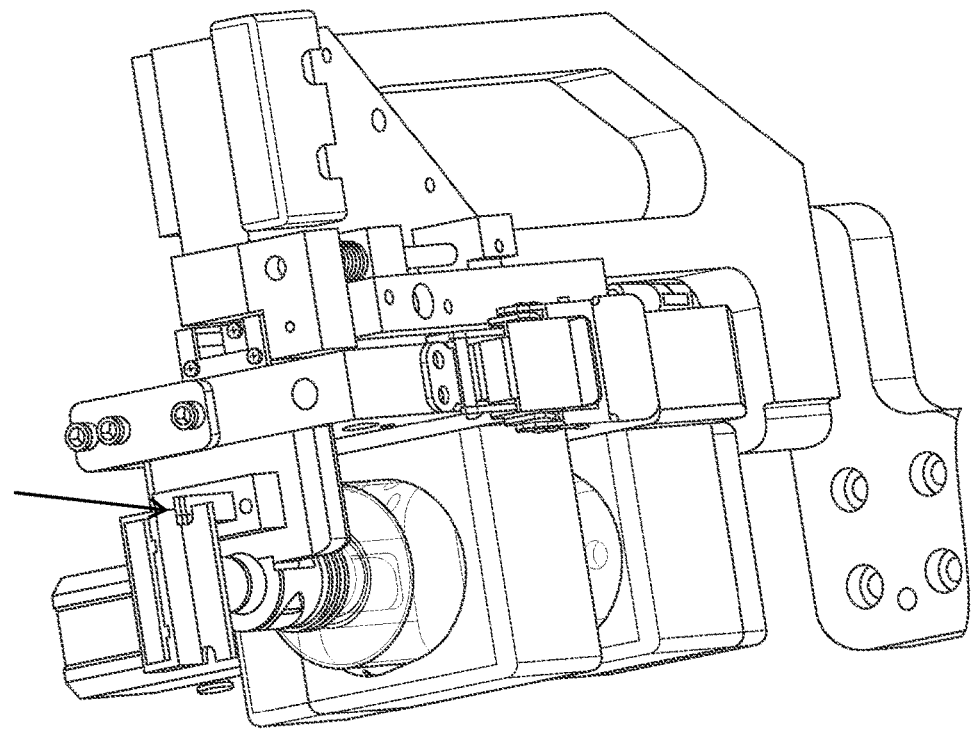
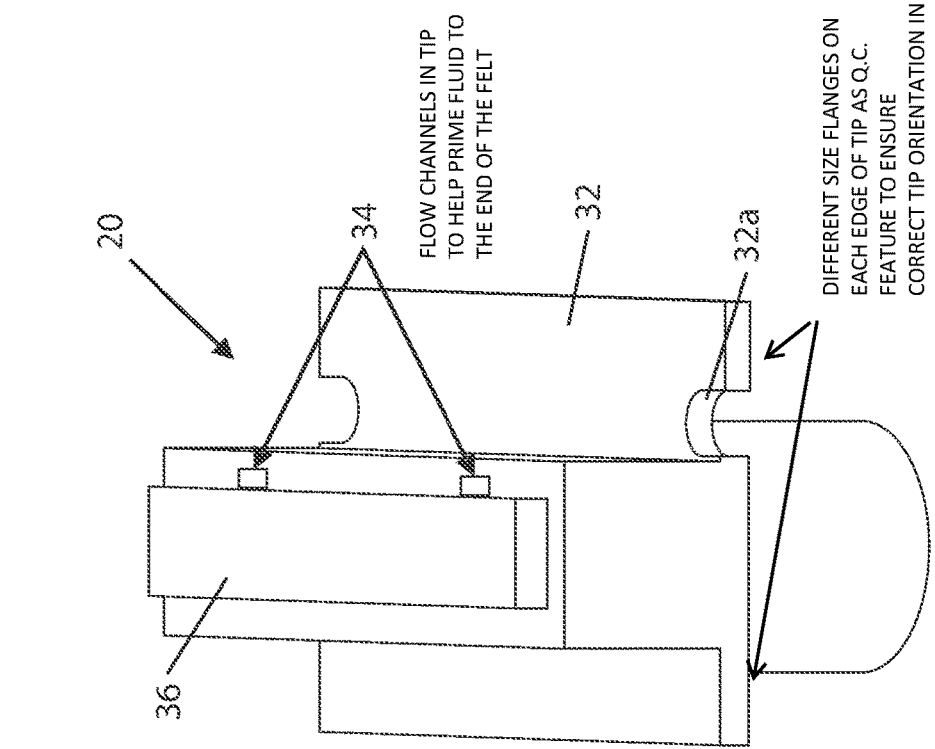
FIG. 12
FIG. 13

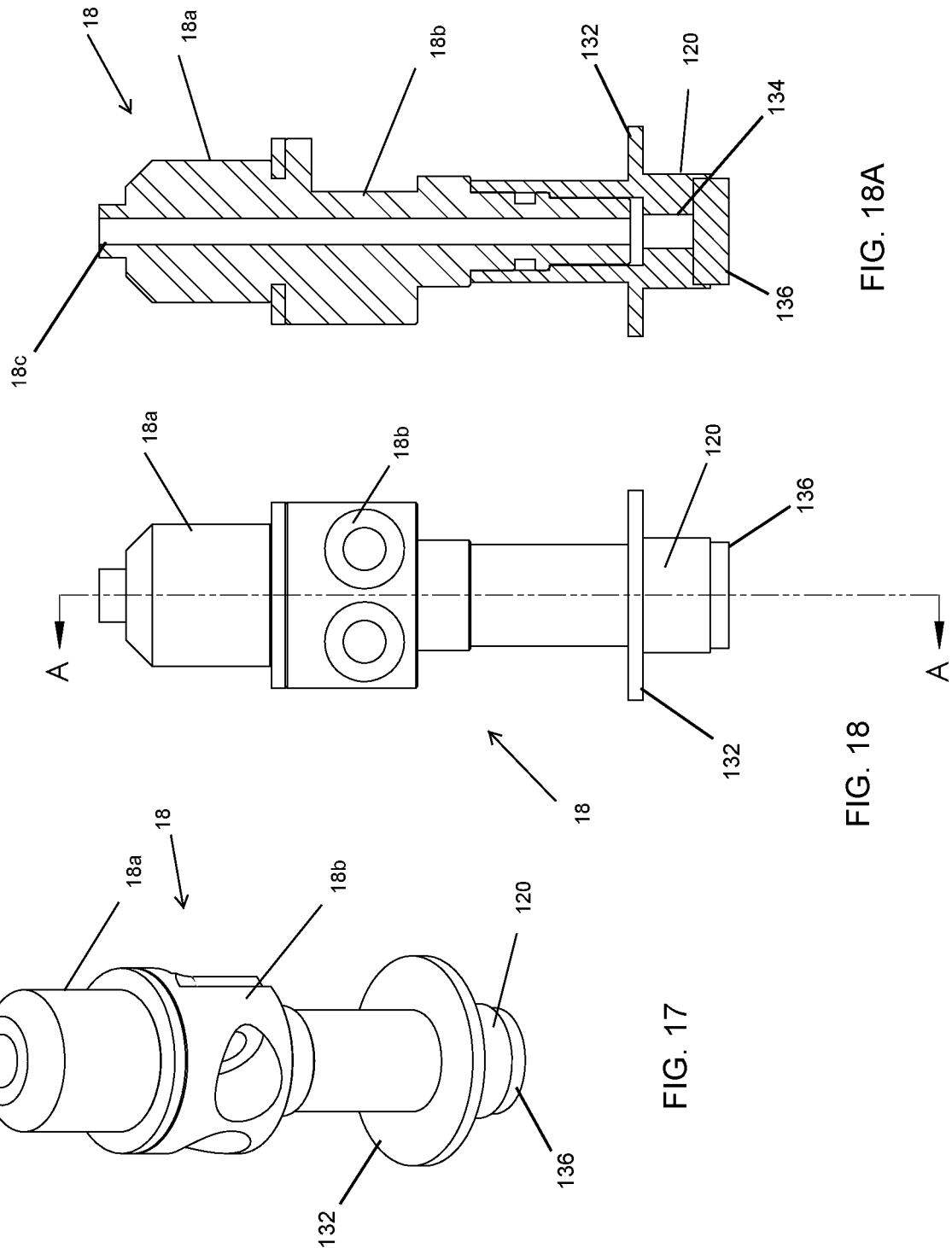

STEP 2
OPERATOR RELEASES LATCH

STEP 1
ROBOT PRESENTS TOOL TO OPERATOR
WITH TIP UP

STEP 3
OPERATOR LOWERS BOTTLE HOLDER PORTION OF TOOL

STEP 4
OPERATOR ROTATES BOTTLE HOLDER PORTION OF TOOL

STEP 6
OPERATOR INSTALLS NEW BOTTLE IN BOTTLE HOLDER

STEP 5
OPERATOR REMOVES BOTTLE FROM BOTTLE HOLDER

STEP 8
OPERATOR RAISES BOTTLE HOLDER PORTION OF TOOL
AND GUIDES BOTTLE ONTO TIP

STEP 7
OPERATOR ROTATES BOTTLE
HOLDER UP AGAINST STOP

STEP 10
8MM PROX WILL DETECT THAT BOTTLE IS PRESENT

STEP 9
OPERATOR LATCHES BOTTLE AND CHECKS TO MAKE SURE BOTTLE IS SEALED AGAINST SEAL

SEALING ADAPTER FOR DISPOSABLE PRIMING TIP OF AUTOMATED GLASS PRIMING DEVICE

CROSS REFERENCE TO RELATED APPLICATION

The present application claims the filing benefits of U.S. provisional application Ser. No. 63/198,195, filed Oct. 2, 2020, which is hereby incorporated herein by reference in its entirety.

FIELD OF THE INVENTION

The present invention relates generally to the field of interior rearview mirror assemblies for vehicles.

BACKGROUND OF THE INVENTION

It is known to apply a primer or priming solution to a glass window panel, such as prior to adhesively attaching a window element to a side of a glass window panel for a vehicle. Such priming processes typically utilize a robot that moves a priming head at the window, with the primer being provided via tubes connected between a reservoir of the priming material and the robot. However, for priming materials that are not suitable for such reservoir and pumping processes, the priming process is manually performed with a priming tip threaded onto a small bottle of primer that is squeezed by an operator to dispense the primer onto the glass window panel.

SUMMARY OF THE INVENTION

A priming system for priming or applying a primer material at a glass window panel for a vehicle includes a robot that holds a bottle or container of priming fluid and that is operable to move the container (e.g., a bottle or other suitable container) to the glass window panel and squeeze the container such that an appropriate amount of primer flows from the container through a priming tip removably attached at the container. The priming tip is removably attached at an adapter that is at least partially received in the end of the container and can be readily removed from the container for replacement and/or for changing the container when its contents have been depleted. The system automatically removes the used tip and automatically disposes of the used tip.

These and other objects, advantages, purposes and features of the present invention will become apparent upon review of the following specification in conjunction with the drawings.

BRIEF DESCRIPTION OF THE DRAWINGS

FIGS. 6-16 are views showing how the primer tip is automatically and robotically removed from the adapter and replaced;

FIG. 17 is a perspective view of the adapter with the primer tip attached thereat;

FIG. 18 is a side elevation of the adapter and tip of FIG. 17;

FIG. 18A is a sectional view of the adapter and tip, taken along the line A-A in FIG. 18;

DESCRIPTION OF THE PREFERRED EMBODIMENTS

Figure 1:
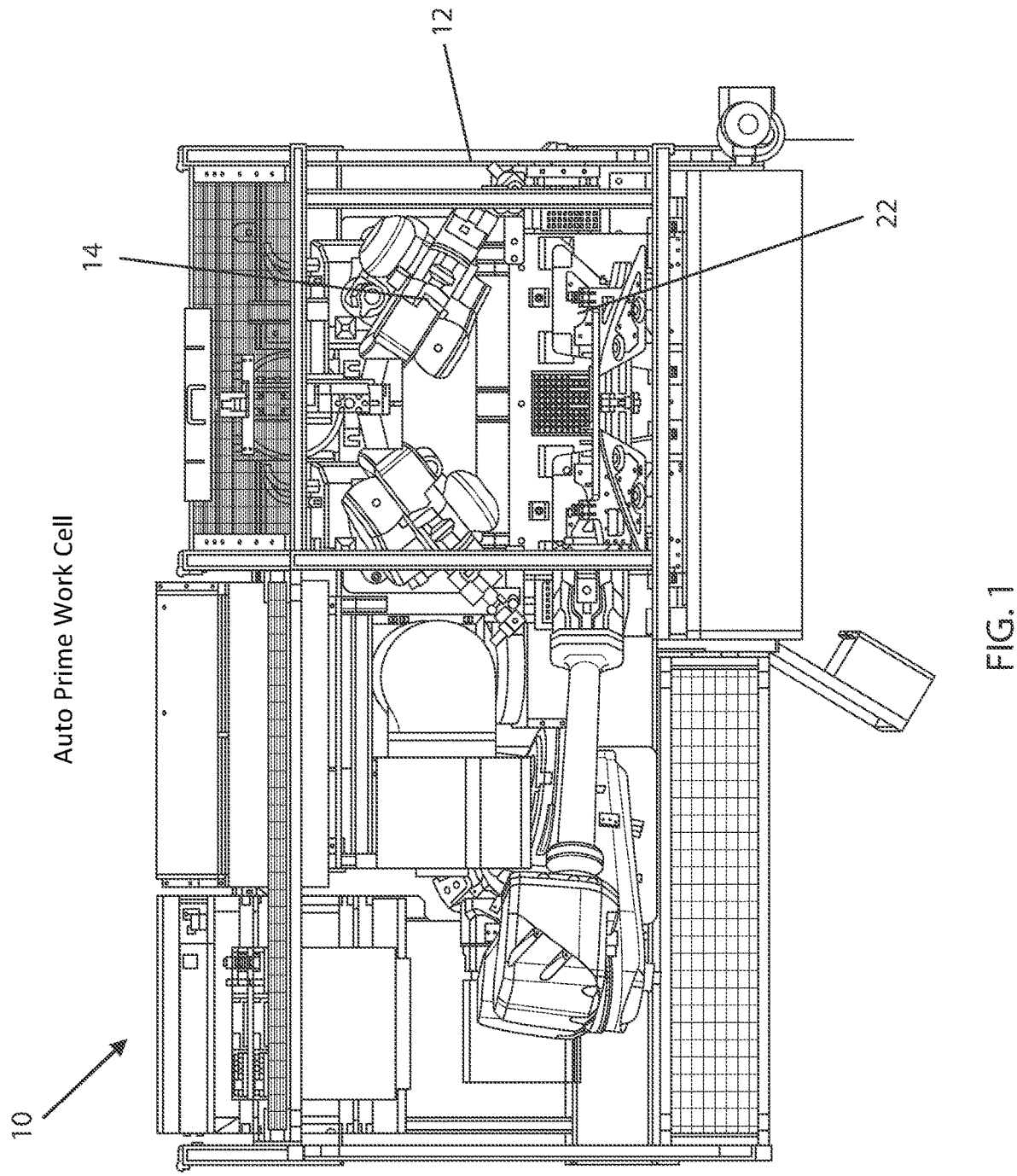
FIG. 1 is a top view of a work cell that utilizes the priming system for applying primer to one or more glass window panels.

Referring now to the drawings and the illustrative embodiments depicted therein, a device or system or process is operable to hold and move a container of primer material, with an adapter detachably attached at an opening of the container, and with the adapter having a primer tip removably attached thereat. The device or system or process moves the container and adapter and tip to a glass window panel and squeezes or compresses the container to dispense an appropriate amount of primer from the container onto a surface of the glass panel, with the tip engaging and swiping along or over the glass surface while applying the dispensed primer. The tip can be removed from the adapter and replaced with a new tip. The container can be removed from the adapter when its contents (primer) are depleted and can be replaced with a new full container. The device or system or process provides a fully automated priming system that is operable to replace tips and dispose of used tips and squeeze or otherwise dispense primer from the container, and thus provides enhanced priming applications with reduced manual labor requirements.

The primer may be applied to a glass surface of a window panel, such as to prime the glass panel for overmolding or encapsulating a portion of the window panel with a polymeric overmolding or encapsulation. The system provides automated application of the primer for applications that use a glass primer having a short shelf life or that use a primer that may skin over (i.e., develop a film or non-viscous outer layer) after a short period of time once exposed to air. Both scenarios prevent the primers from being dispensed via a typical automated primer system (i.e., a system where the primer material is dispensed from a vessel to a disposable priming tip by way of a peristaltic pump). Instead, the primer is dispensed from containers, such as plastic bottles or pouches or tubes or other suitable vessels, containing a volume of primer (e.g., 10 or fewer ounces) that will not expire over the course of multiple applications. A reusable adapter is inserted into an opening of the container and a disposable primer tip is attached at the reusable adapter so that when the container is squeezed to dispense primer, the primer is guided through the opening of the container, through the adapter, and guided onto the glass surface via the primer tip. Because the state of the primer changes quickly when exposed to the environment, the primer tip may become clogged or otherwise unusable after a period of time. Thus, the primer tip is removable and replaceable to ensure consistent primer application at multiple glass surfaces. The robotic priming system may eliminate a primer operator per shift for either a four cavity molding work cell or a two cavity work cell with a large quarter window.

Figure 3:
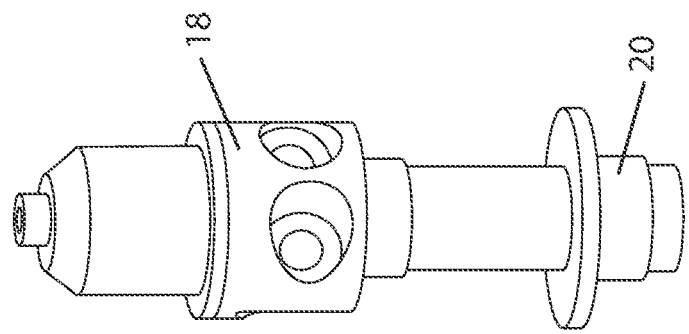
FIG. 3 is a perspective view of the priming tip attached at an end of the adapter.
Figure 2:
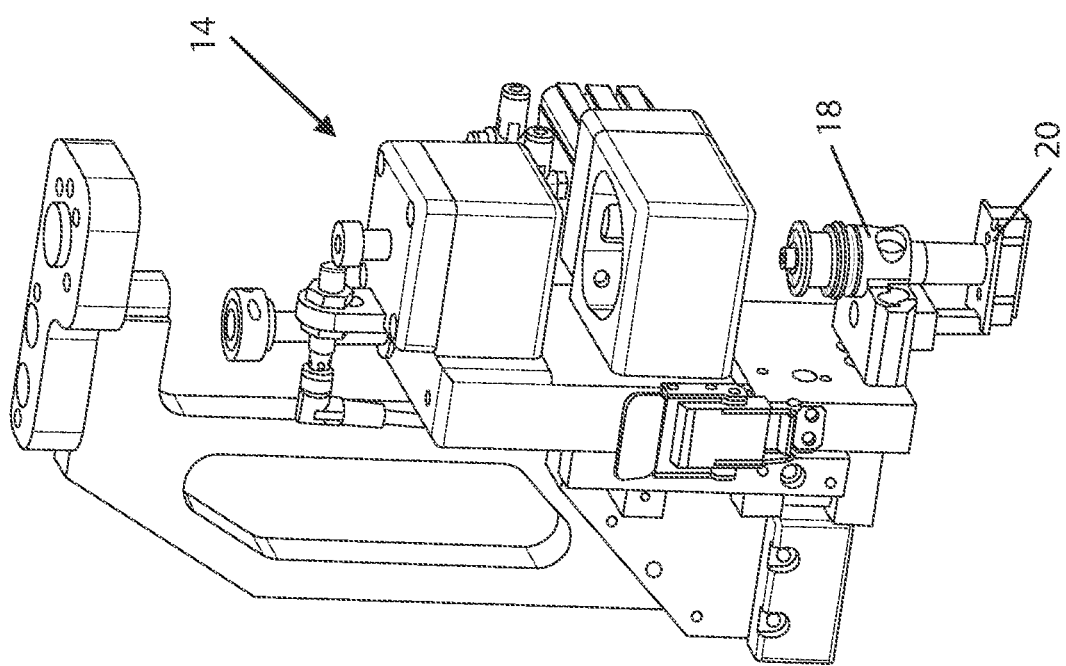
FIG. 2 is a perspective view of the primer head that holds a container of primer with an adapter and priming tip and that moves the container and squeezes the container to dispense an appropriate amount of primer onto the glass window panel.
Figure 5:
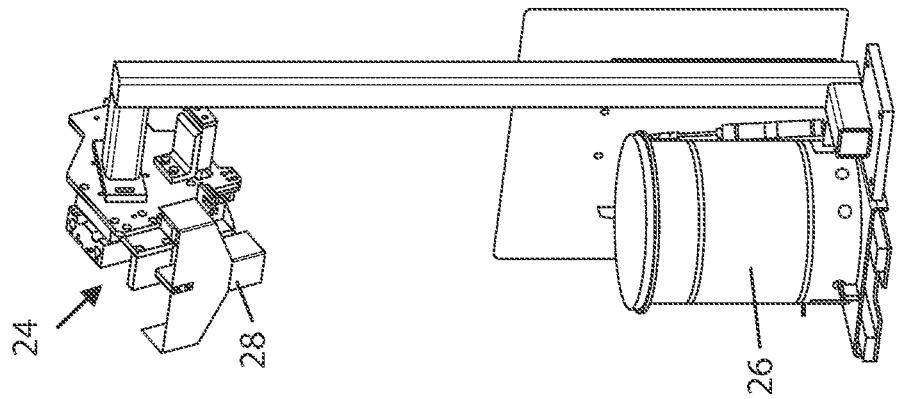
FIG. 5 is a perspective view of a waste container for receiving used tips therein after the system removes the tips and tilts to dispose the tips into the container.
Figure 4:
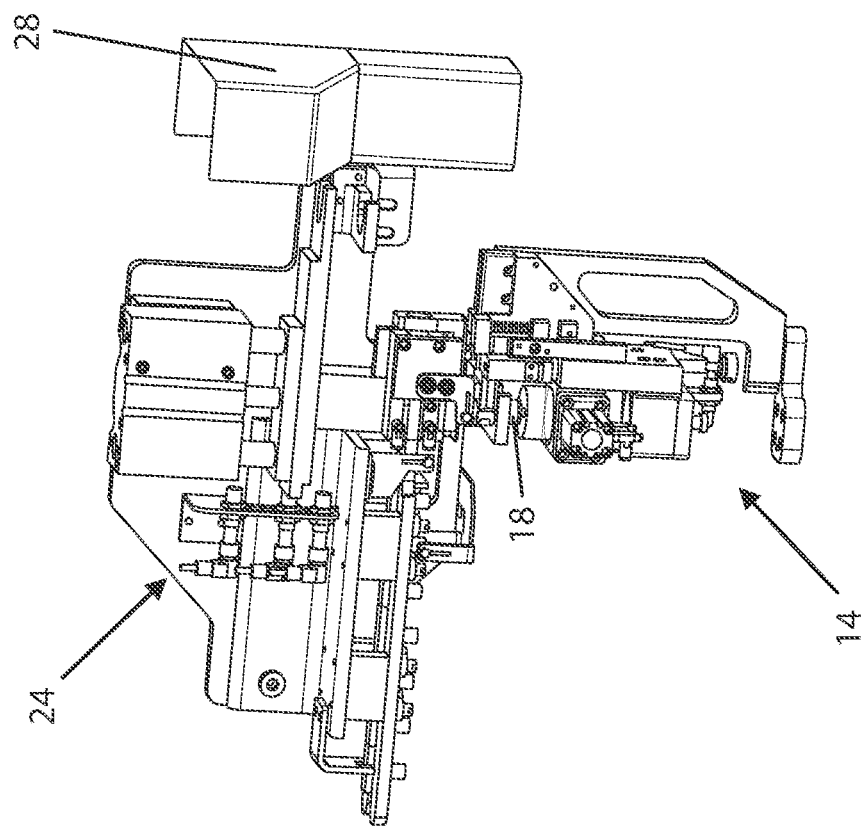
FIG. 4 is a perspective view of the primer head, shown at a tip changer for changing the priming tip.
Figure 6:
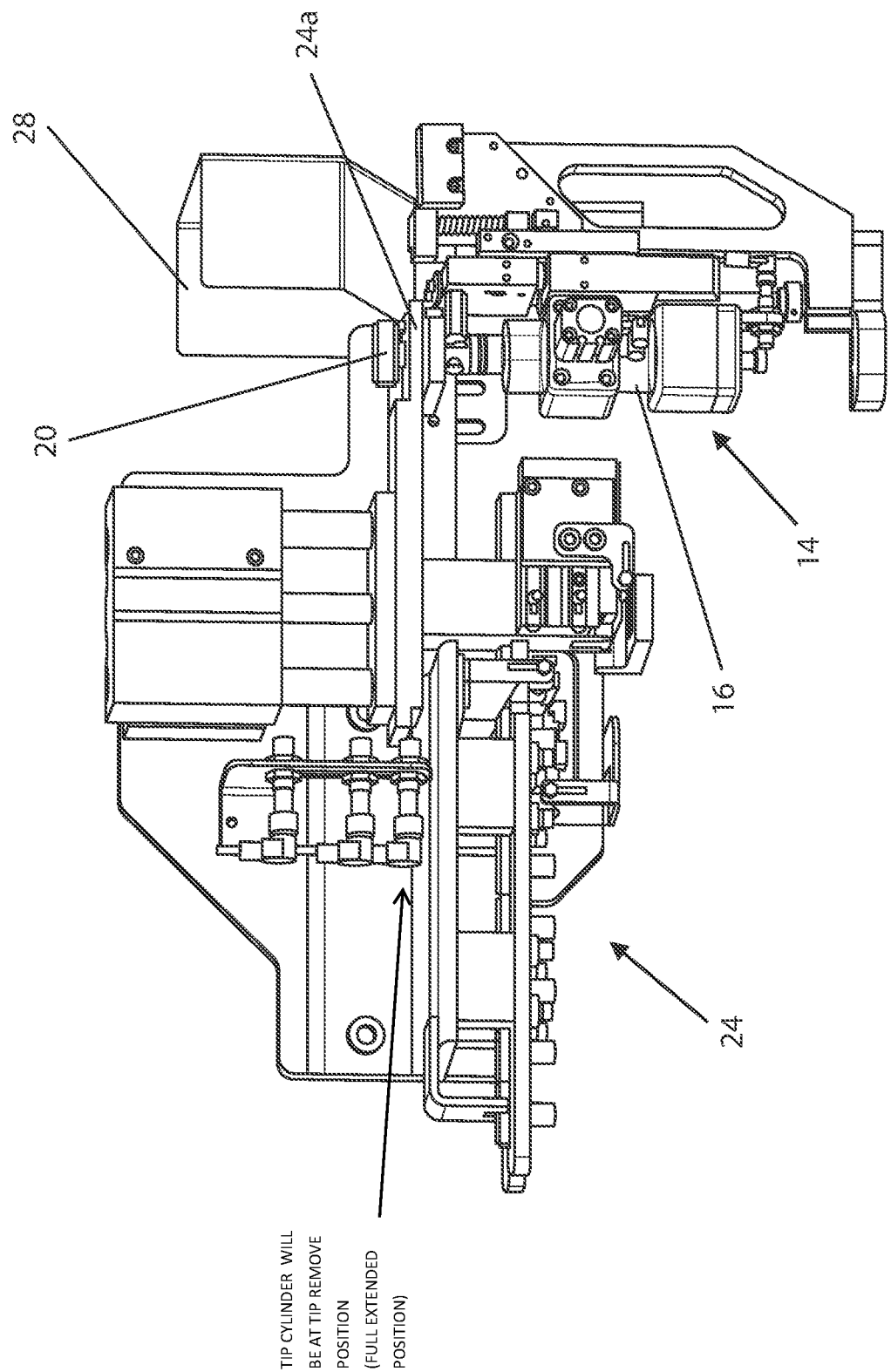

The system 10 includes a work cell or chamber 12 where a primer head 14 is disposed and movable therein to move a container 16 and adapter 18 and primer tip 20 within the chamber 12 to apply primer at a surface of one or more glass window panels 22 (FIGS. 1-3). As discussed further below, the primer head 14 receives the container 16, engages the container 16 with the adapter 18 (and therefore primer tip 20) and applies pressure at the container 16 to dispense the primer. The primer head 14 is movably attached at a tip changing device 24 (FIG. 4), which is operable to remove and replace the primer tip 20 at the adapter 18 and to dispose the removed tip at a disposal container 26 via a tip disposal element 28 of the tip changing device 24 (FIG. 5).

Figure 7:
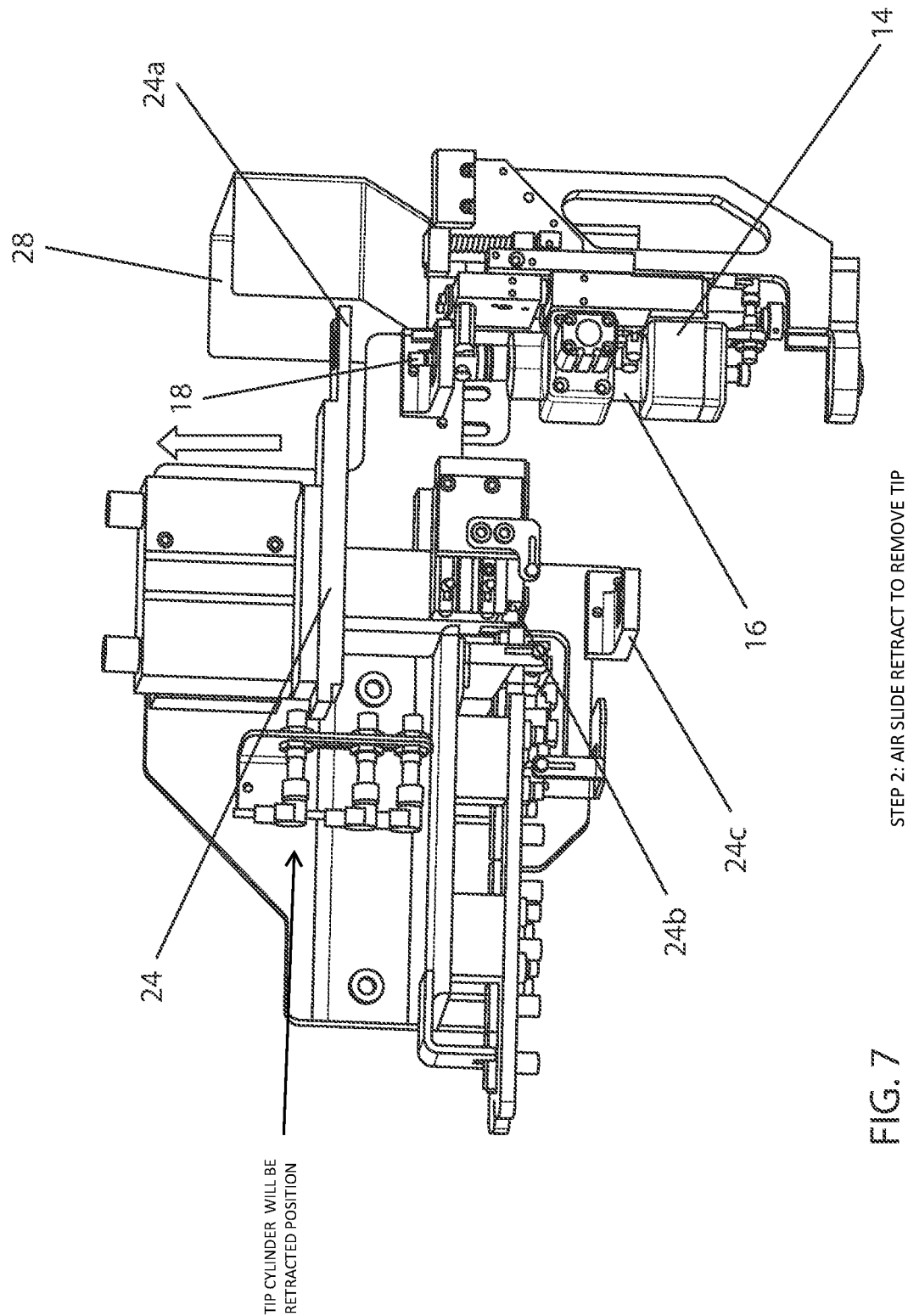
Figure 8:
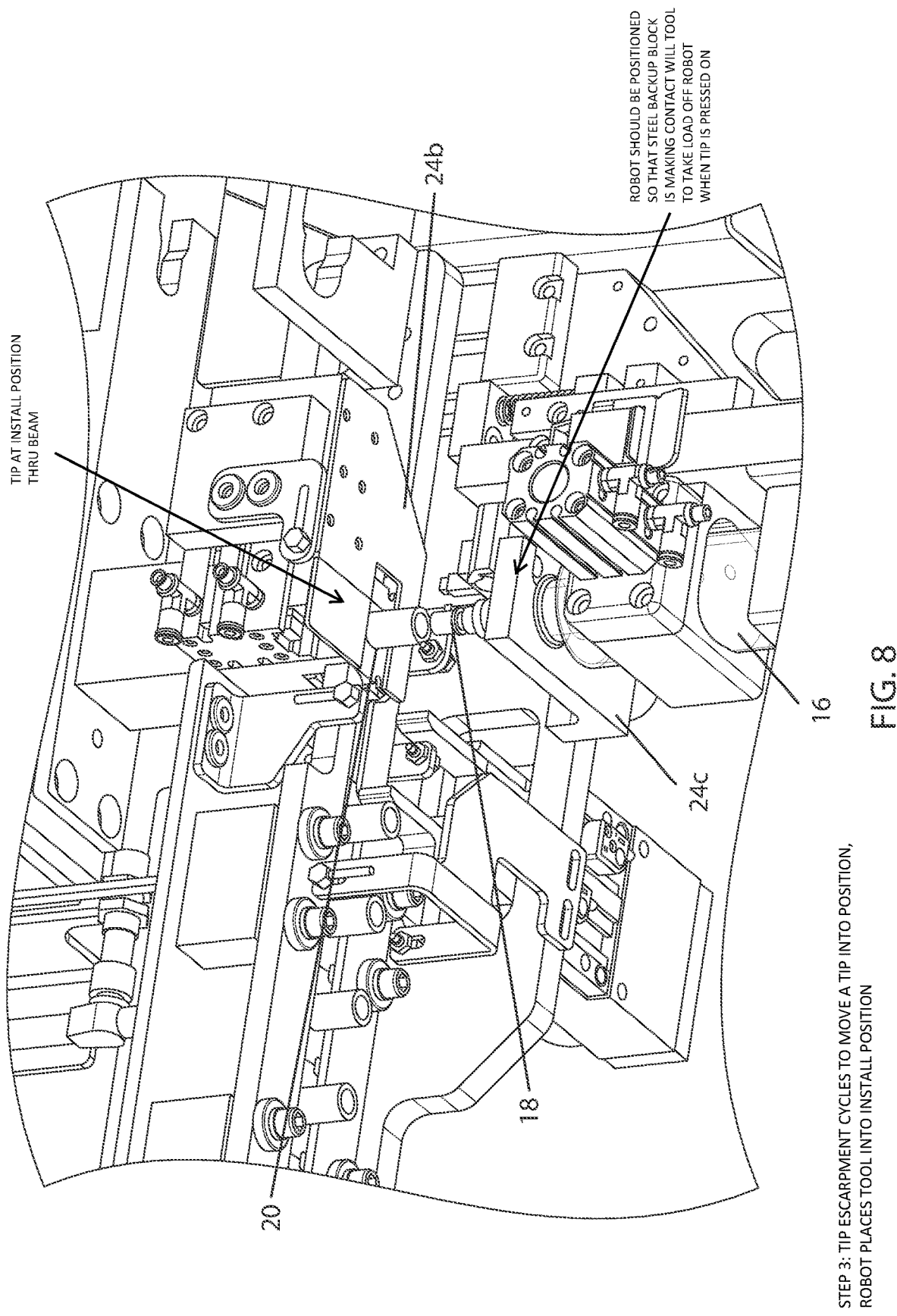
Figure 9:
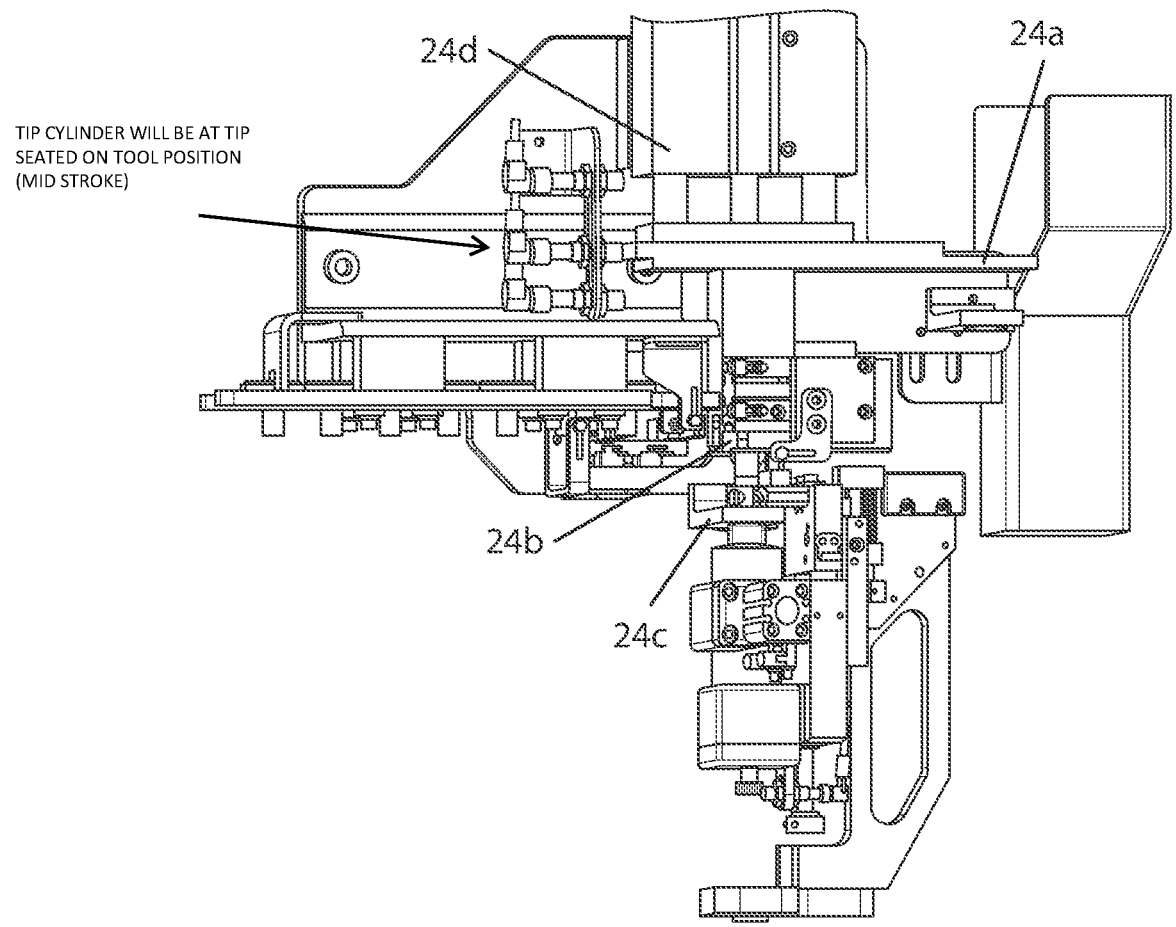
Figure 10B:
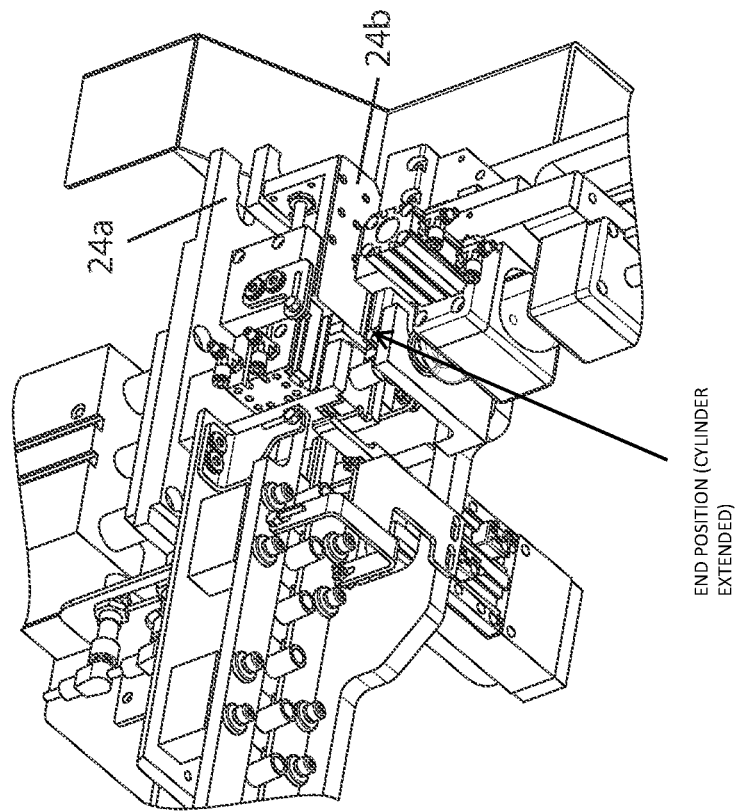
Figure 10A:
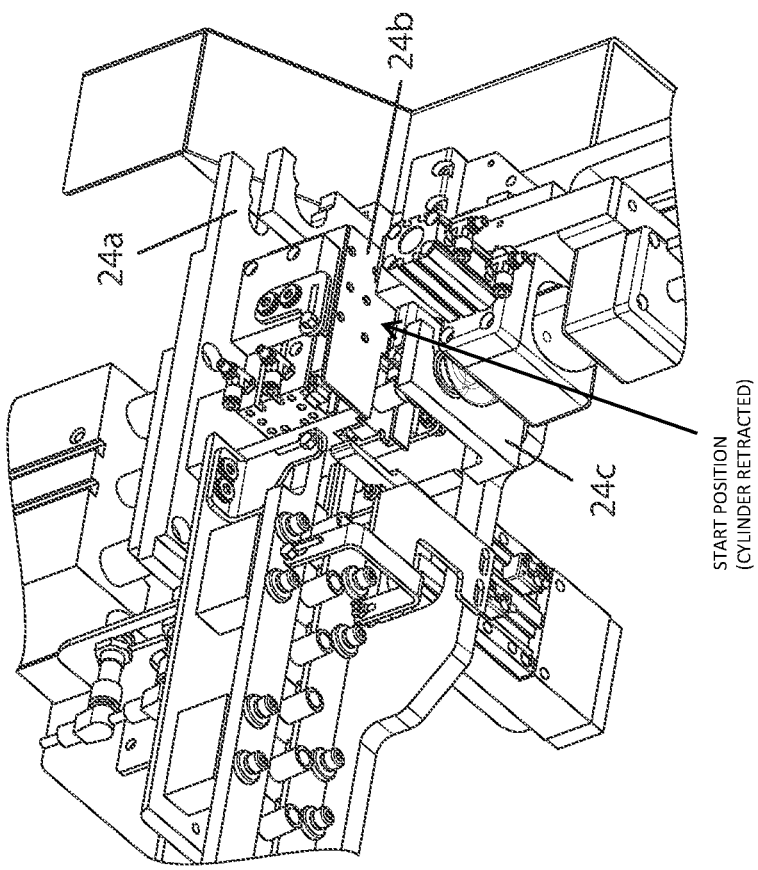
Figure 11:
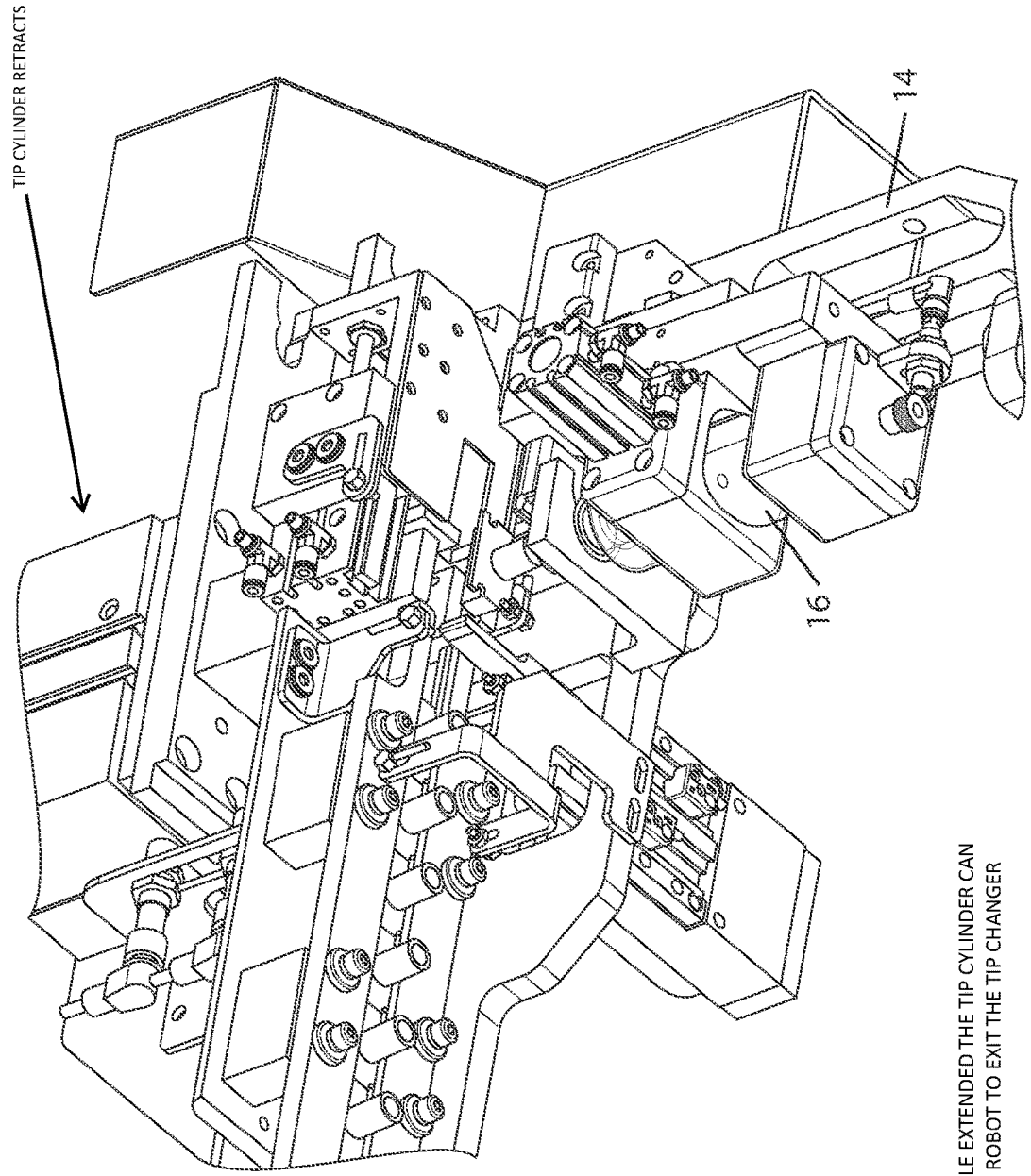

As shown in FIGS. 6-16, the primer tip 20 can be automatically changed when it is worn or nearing the end of its life cycle. This is accomplished by the robot positioning the primer head 14 in a tip removal position at the tip changing device 24 (FIG. 6), and retracting the tip 20 from the adapter 18 (FIG. 7). The primer head 14 is positioned so that the primer tip 20 and adapter 18 are in proximity to the tip disposal element 28 and the tip changing device 24 extends to position a slotted plate or tip removing portion 24a of the tip changing device 24 at the primer tip 20. For example, the tip removing portion 24a may be positioned around the primer tip 20 and below a flange of the primer tip 20 so that when the tip changing device 24 moves the tip removing portion 24a vertically relative to the primer tip 20, the primer tip 20 is retracted from the adapter 18. A new tip 20 is moved into position and aligned with the adapter 18 (FIG. 8), such as by a tip installing portion 24b of the tip changing device 24, and then pressed onto the adapter 18 and the primer head 14 can exit the tip changing device 24 (FIGS. 9-11).

The tip changing device 24 may further include a backup block or tip supporting portion 24c that takes the load off the primer head 14 when the new tip 20 is pressed onto the adapter 18, such as by engaging a portion of the primer head 14 when the tip installing portion 24b is aligned with the adapter 18 and presses the new tip 20 onto the adapter 18. As shown in FIG. 9, the tip removing portion 24a, tip installing portion 24b, and tip supporting portion 24c may all be vertically positioned along the same movable component of the tip changing device 24, such that vertical positioning of the component may determine which portion of the tip changing device 24 engages the primer head 14. For example, the portions may be positioned along a tip cylinder or air slide 24d of the tip changing device 24. When installing the tip 20 at the adapter 18, the air slide 24d may extend to press the tip 20 onto the adapter 18 and the air slide 24d will stop extending when the tip 20 is seated. Once the tip 20 is seated at the adapter, the tip installing portion 24b will retract from under the flange of the tip 20 and the primer head 14 may be allowed to exit the tip changing device 24.

Figure 16:
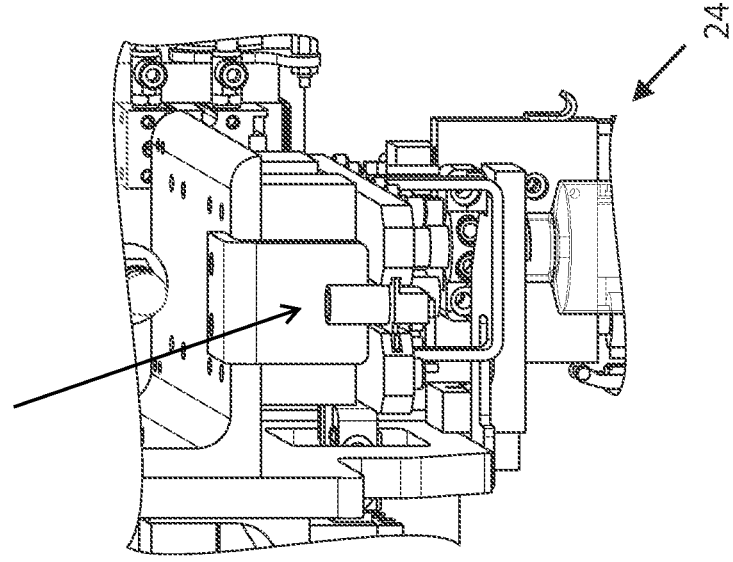
Figure 15:
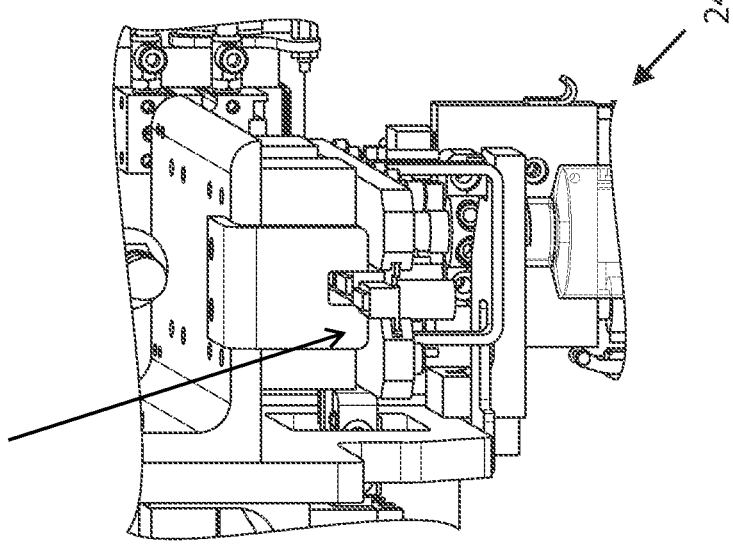
Figure 14:
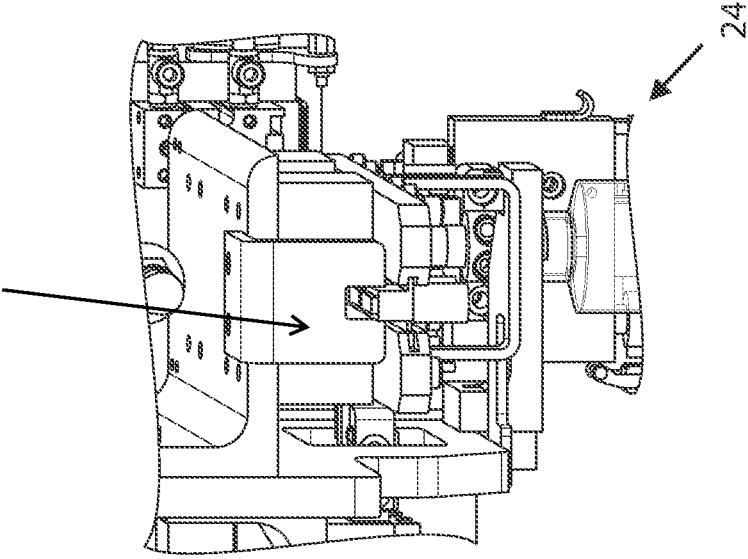

As shown in FIG. 12, the tip 20 includes a rectangular flange 32, flow channels 34, and a felt pad or spreader 36. The flow channels 34 are configured to prime the primer at the end of the spreader 36. Because the rectangular flange 32 and spreader 36 are not symmetrical, the flow channels 34 must be oriented according to the travel direction of the primer head 14 so that the spreader 36 may appropriately spread the primer dispensed by the flow channels 34. The flange 32 may include a feature or notch 32a to help orient the tip 20 correctly at the adapter 18. For example, a post on the primer head 14 or tip changing device 24 may engage the notch 32a at the flange 32 to ensure correct tip orientation and keep the tip 20 from rotating as the tip 20 is pressed onto the adapter 18 (FIG. 13). As shown in FIGS. 14-16, the tip changing device 24 includes alignment structure that queues replacement tips 20 and aligns the tip 20 for placement at the adapter 18. The tip changing device 24 engages the flanges 32 of the tips 20 to align the tips relative to the adapter 18.

The adapter may be configured to receive different sized and/or shaped tips, such as configured for different primer applications. For example, FIGS. 17, 18 and 18A show a tip 120 with a circular flange 132 and a circular felt pad or spreader 136, with a flow channel 134 at or behind the felt spreader 136.

Figure 19:
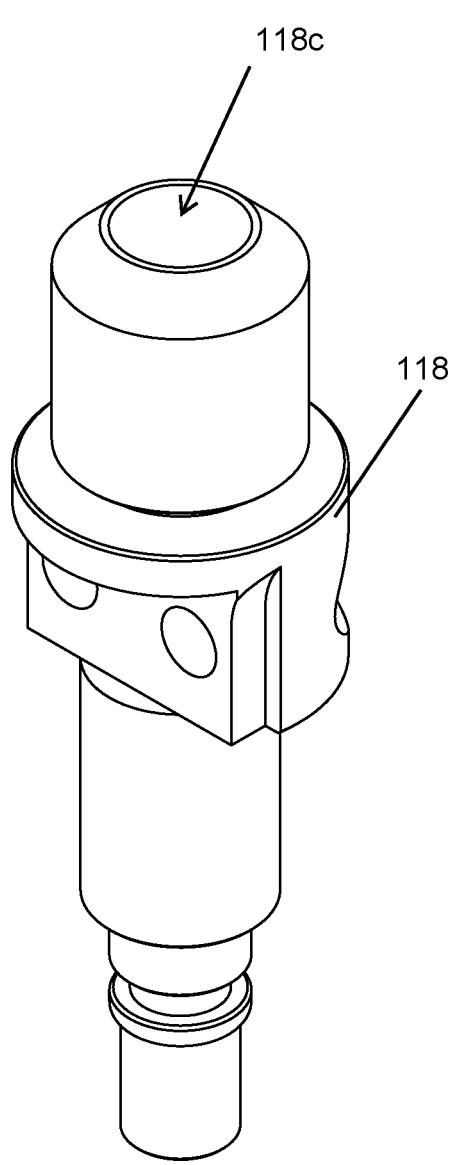
FIG. 19 is a perspective view of another adapter that has been tapped or bored for insertion of a flow restrictor orifice.
Figure 20:
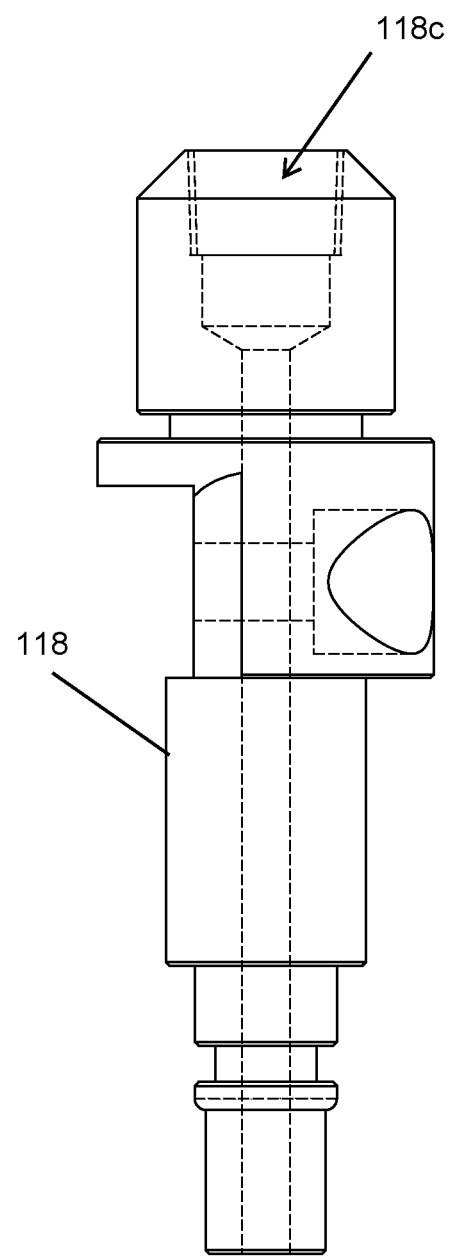
FIG. 20 is a side elevation view of the adapter of FIG. 19, with dashed lines showing the bores of the adapter.
Figure 21:
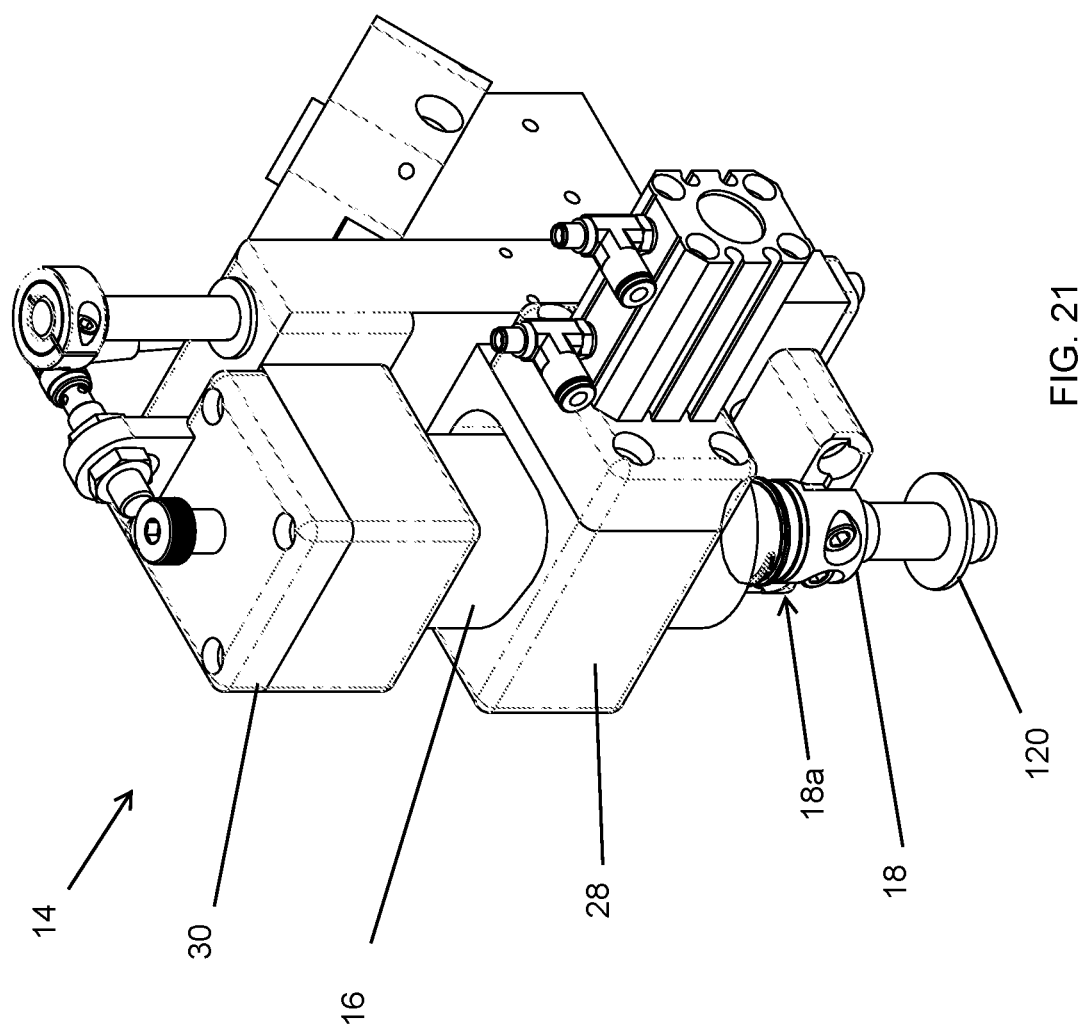
FIGS. 21-28 are views showing the device that holds the container and adapter and tip and moves the container and adapter and tip and squeezes the container to dispense the primer material through the adapter and tip.
Figure 23:
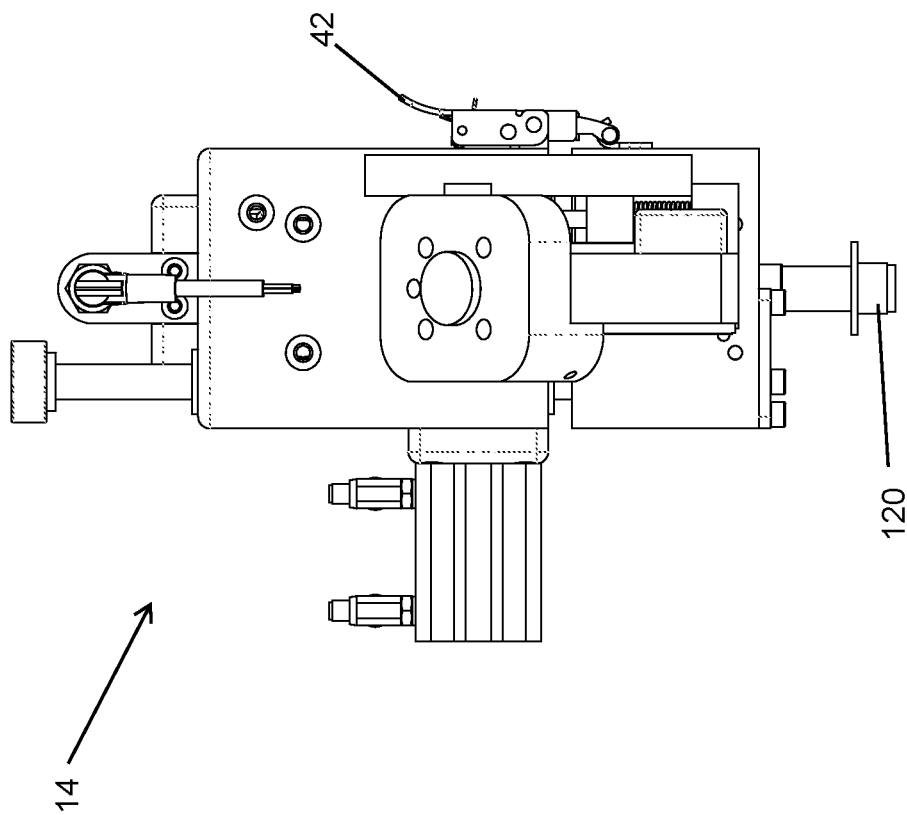
Figure 22:
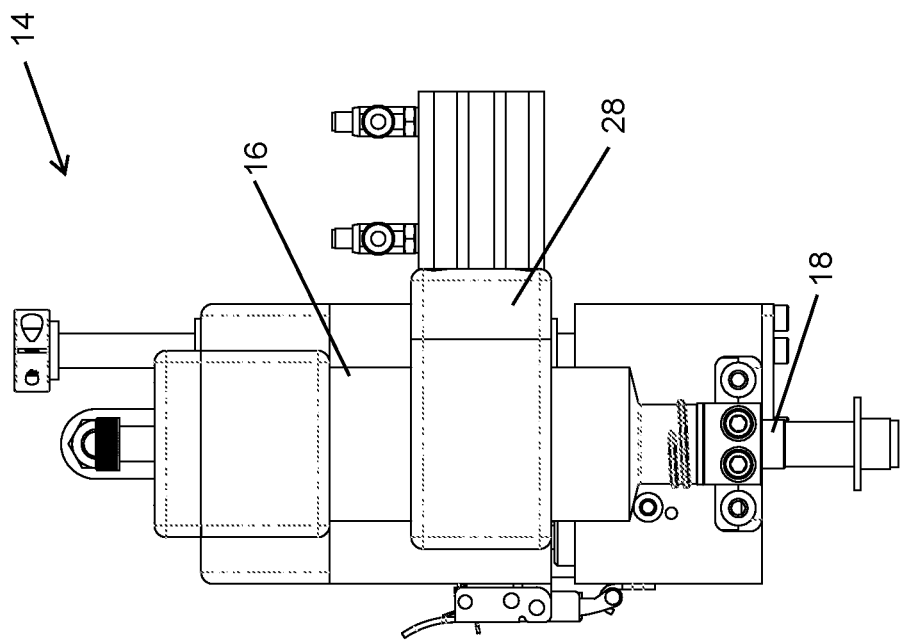
Figure 26:
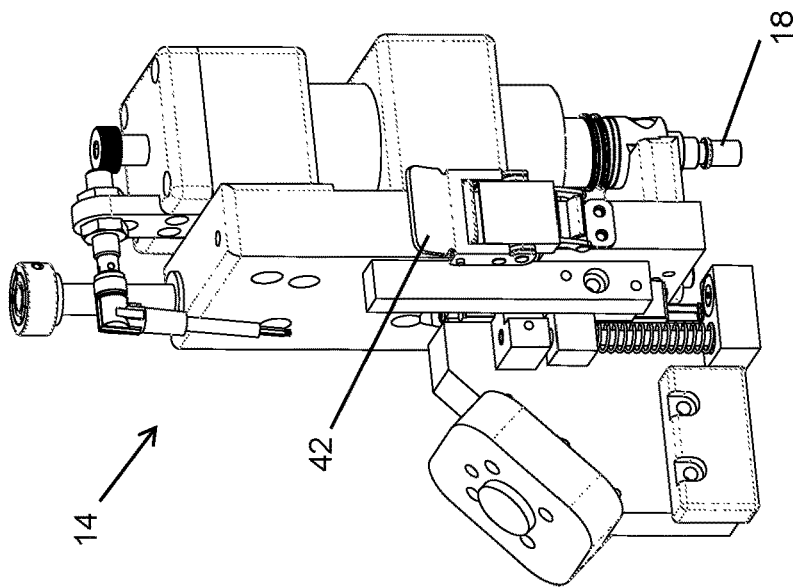
Figure 25:
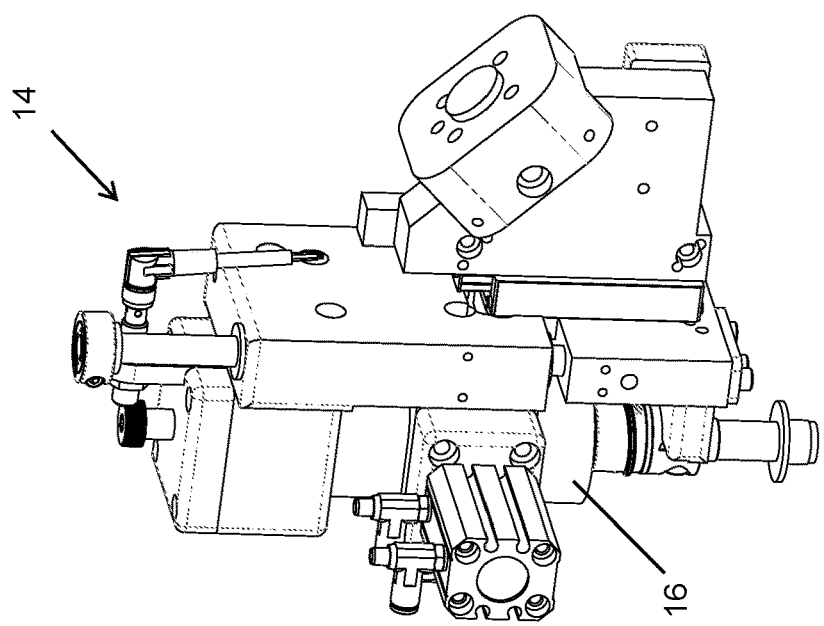
Figure 24:
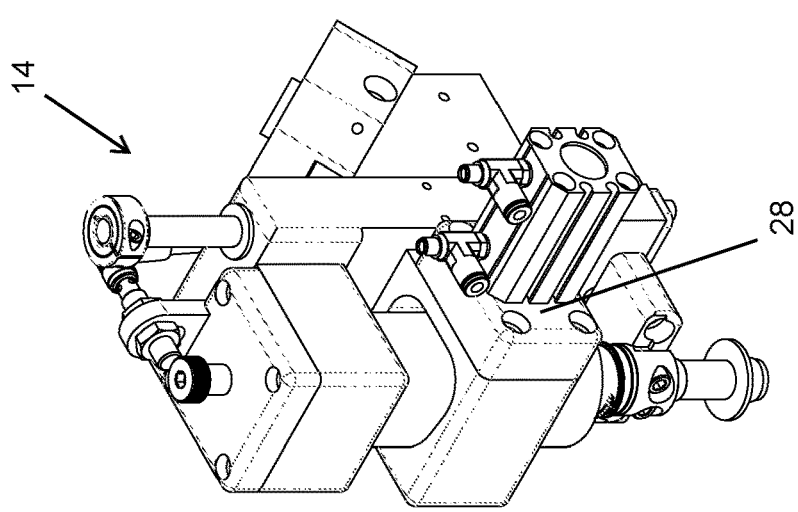
Figure 28:
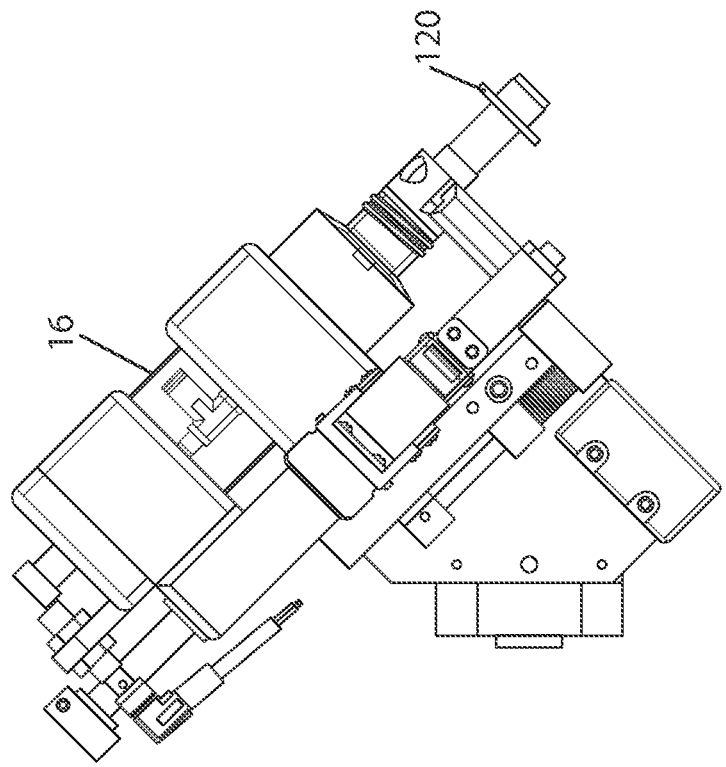
Figure 27:
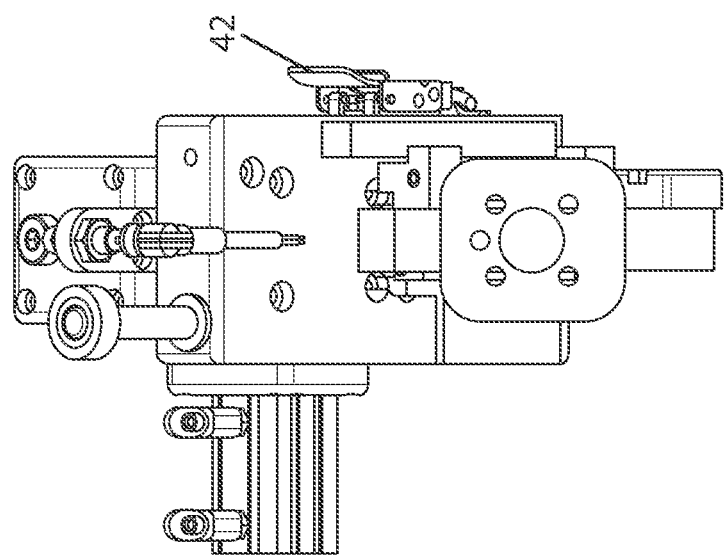
Figure 29:
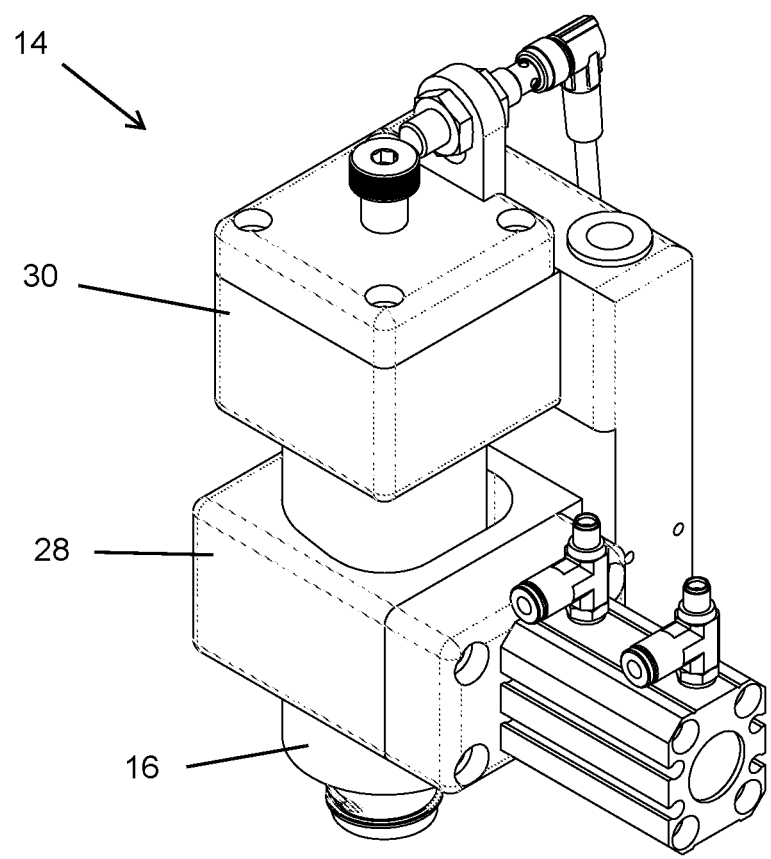
FIG. 29 is a perspective view of the device of FIGS. 21-28, with the adapter and tip removed from the container.
Figure 30A:
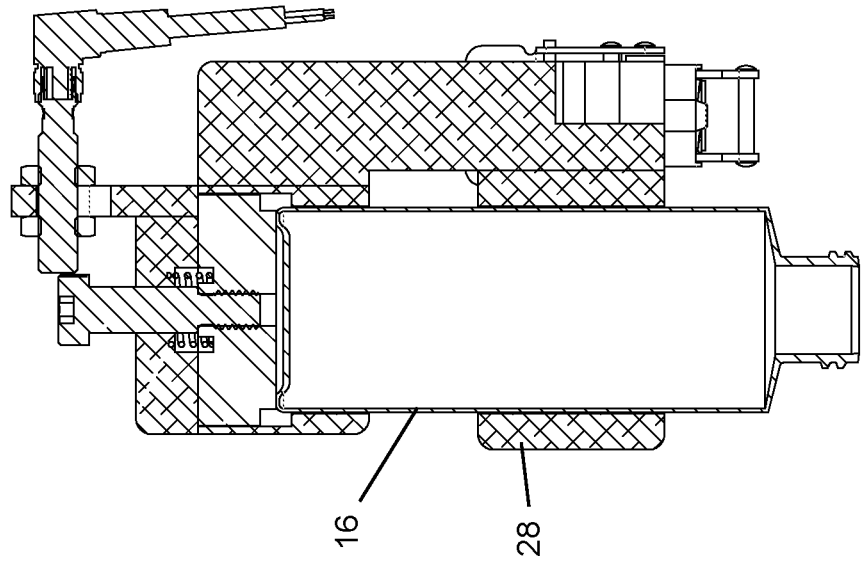
FIG. 30A is a sectional view of the device taken along the line A-A in FIG. 30.
Figure 30:
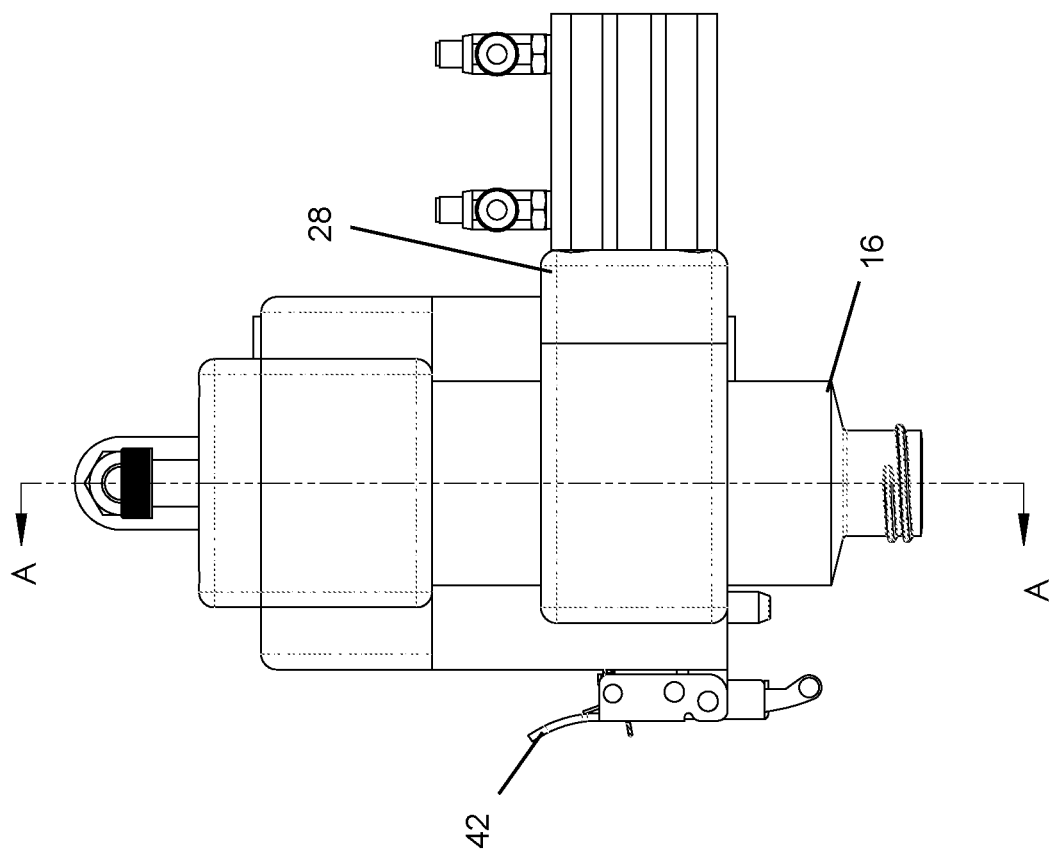
FIG. 30 is a side elevation of the device of FIG. 29.
Figure 31:
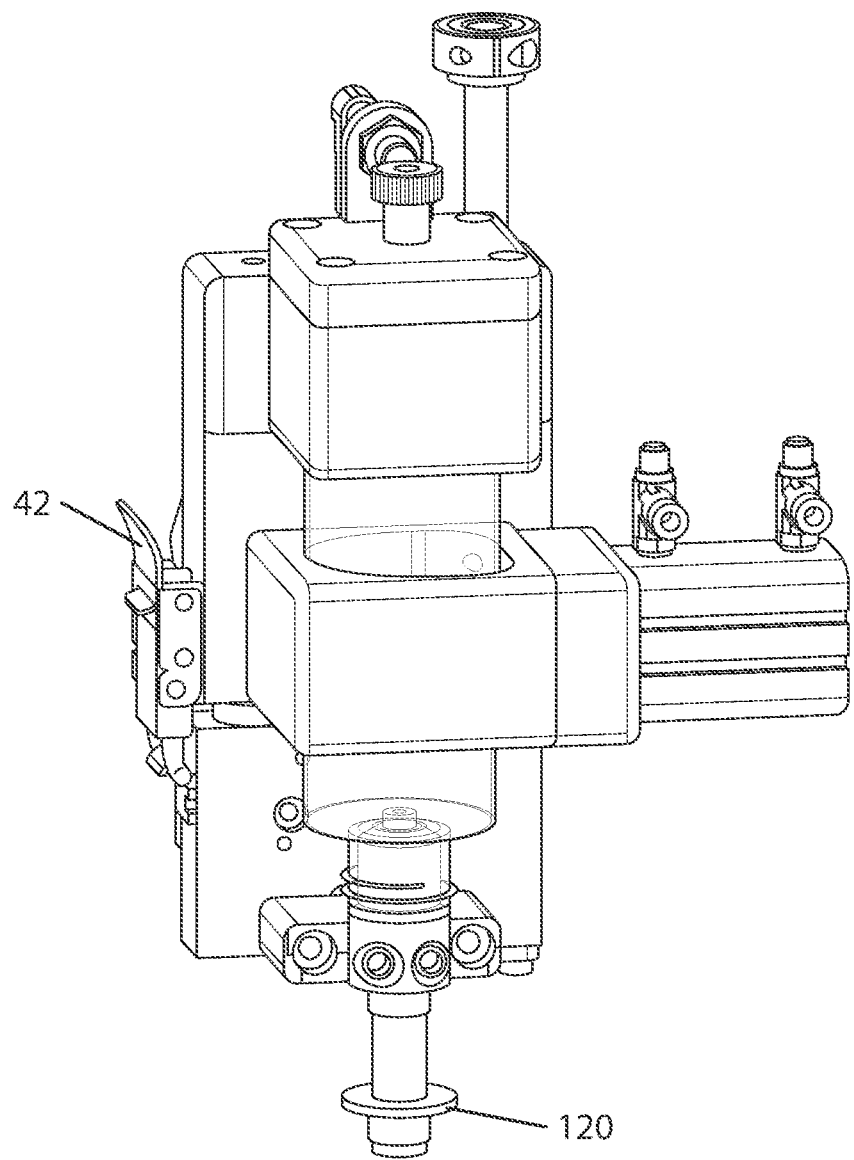
FIGS. 31-37 are views showing the device when operated to squeeze or compress the container to dispense the primer material through the adapter and tip.

The adapter 18 comprises a first portion or cylindrical attaching portion 18a that is configured to be press fit into the opening of the bottle or container 16. The adapter 18 includes a second portion or holding or mounting portion 18b that is configured to attach to the primer head 14 to retain the adapter 18 in place at the head and at the container 16, such as during changing of the container, as discussed below. The tip 20 is pressed onto the end of the adapter 18 opposite the attaching portion 18a (such as via the tip changing device 24 described above). The adapter 18 includes a fluid channel 18c from the attaching portion 18a to the flow channel of the tip so that the primer may flow from the container to the tip and onto the glass window panel. Optionally, and such as shown in FIGS. 19 and 20, an adapter 118 may include a bored or tapped opening of the fluid channel 118c for insertion of a flow restrictor orifice. Otherwise, the adapter 118 is substantially similar to the adapter 18 discussed throughout.

As shown in FIGS. 21-37, the attaching portion 18a of the adapter 18 is received in the opening of the container 16 and the container is received through a deformer or compressing device 28 of the primer head 14, with the mounting portion 18a of the adapter 18 attached to the primer head 14 and the end of the container opposite the opening is received in a receiving portion or cylinder 30. With the container 16 and adapter 18 and tip retained at or secured at the primer head 14, the primer head 14 is moved to the glass window panel 22 within the chamber 12 to prime a surface of the glass window panel 22. With the tip positioned at the surface to be primed, the compressing device 28 is actuated, which (as best shown in FIGS. 32-37) extends a piston or cylinder 38 that deforms or squeezes the bottle or container 16 an appropriate amount to dispense an appropriate amount of primer from the container 16, through the adapter 18 and onto and through the priming tip. The compressing device 28 is automatically controlled to squeeze or deform the container 16 the appropriate amount responsive to the tip being positioned at the surface of the glass window panel 22 to be primed.

Figure 33:
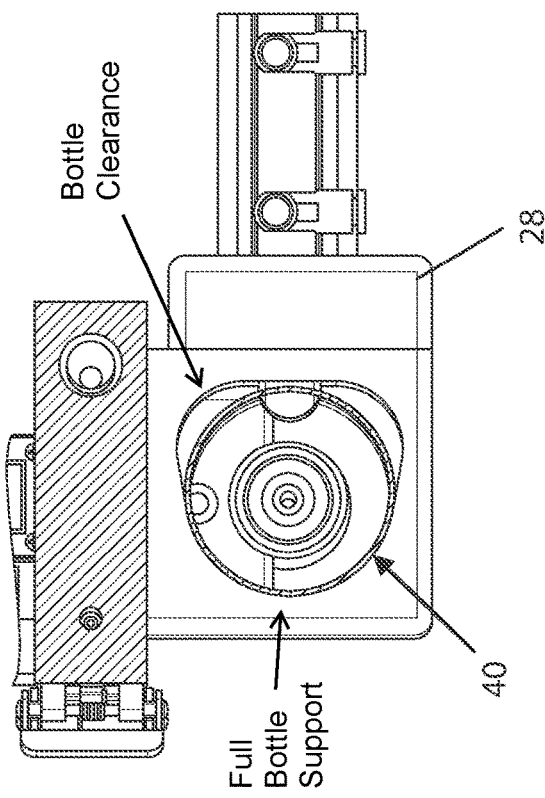
Figure 32:
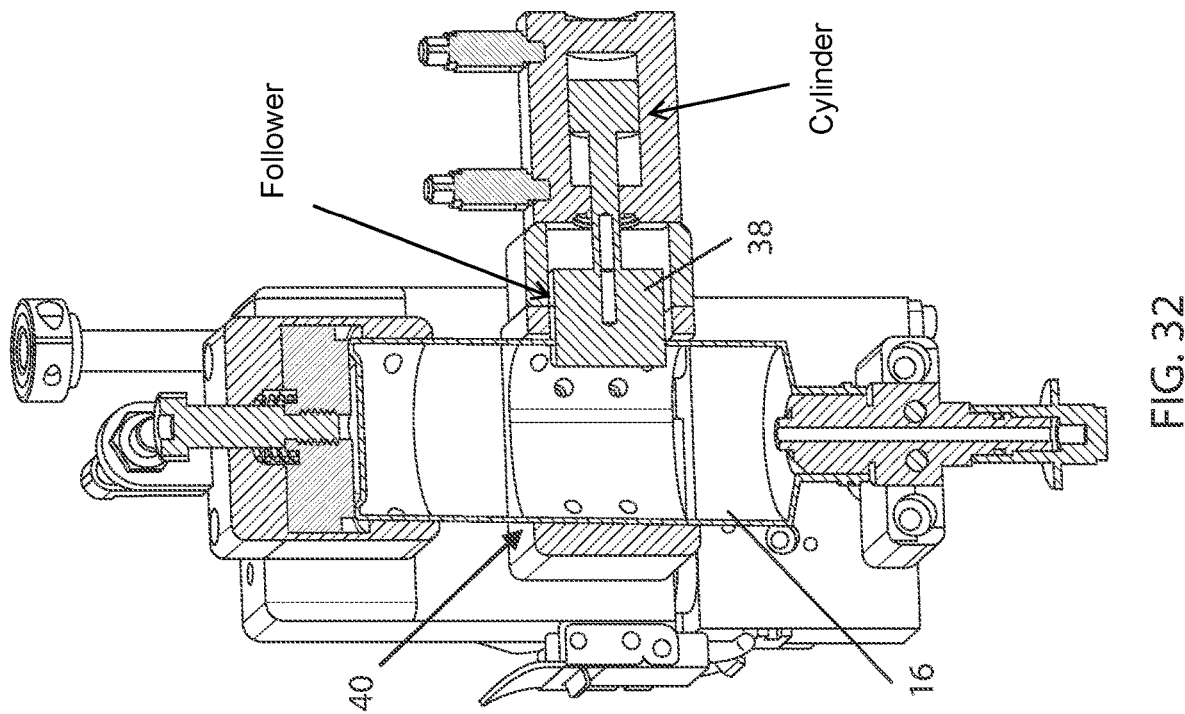

The container deformer or container squeeze cylinder 38 is designed to mimic the action of the container being manually squeezed, such as by an operator's thumb. A PLC controlled pressure regulator is used to control the air pressure to the cylinder 38 using an Analog PLC output. Higher pressure will result in a faster primer flow rate. As shown in FIGS. 32 and 33, the container 16 is received through a receiving portion 40 of the compressing device 28 and the cylinder 38 is configured to extend into the receiving portion 40 to compress or apply pressure at the container 16.

In the illustrated embodiment, the container 16 is received within the receiving portion 40 such that side walls of the receiving portion 40 wrap around or encircle an outer circumference of the container 16. The cylinder 38 extends through or from an interior side wall of the receiving portion 40 to apply the pressure at the outer surface of the container 16. The receiving portion 40 has clearance on the side that the squeeze cylinder extends from to allow the container 16 to compress and deform into the clearance area. The side opposite the cylinder 38 offers full container support to help the container 16 recover its original shape when the cylinder 38 is retracted. In other words, when the container 16 is extended into the receiving portion 40, one portion of the side wall of the receiving portion is configured to be spaced from the surface of the container and another portion of the side wall of the receiving portion substantially conforms to the shape of the container to guide the container back into shape after being deformed from the pressure of the cylinder when dispensing the primer.

Figure 35:
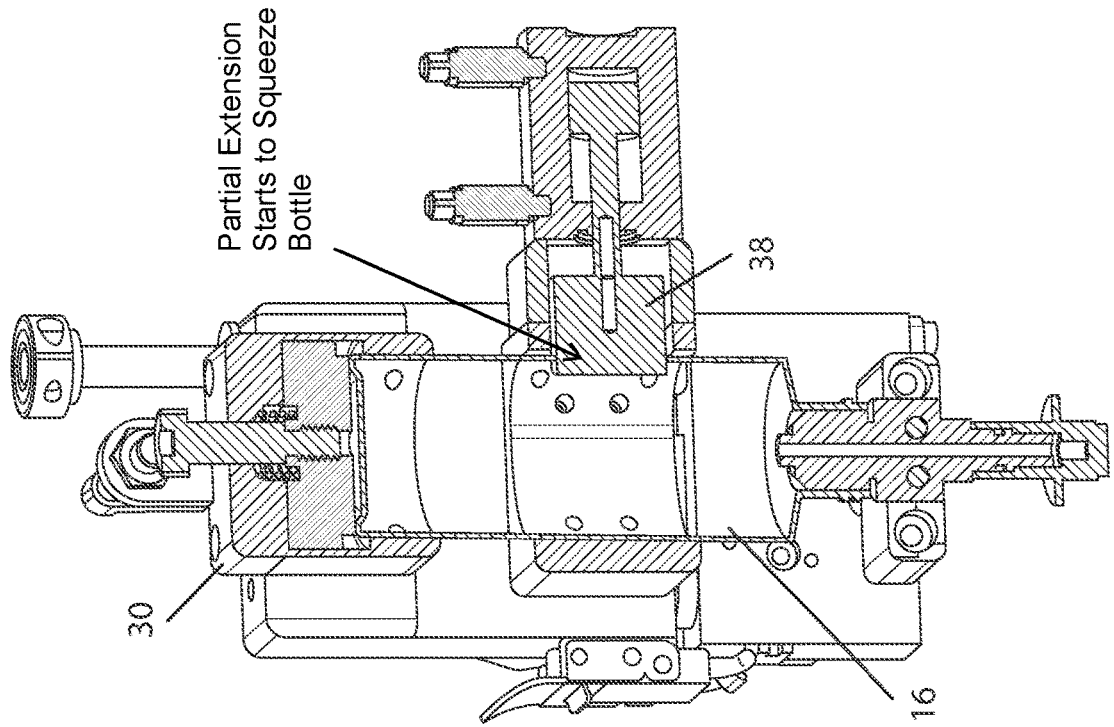
Figure 34:
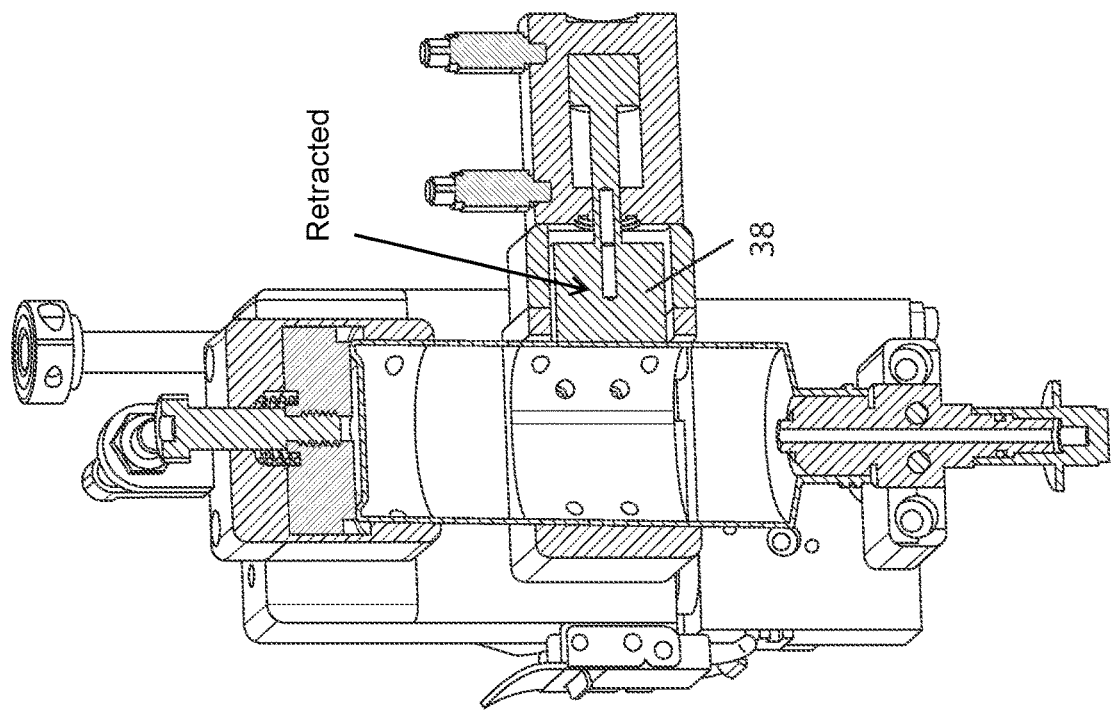
Figure 37:
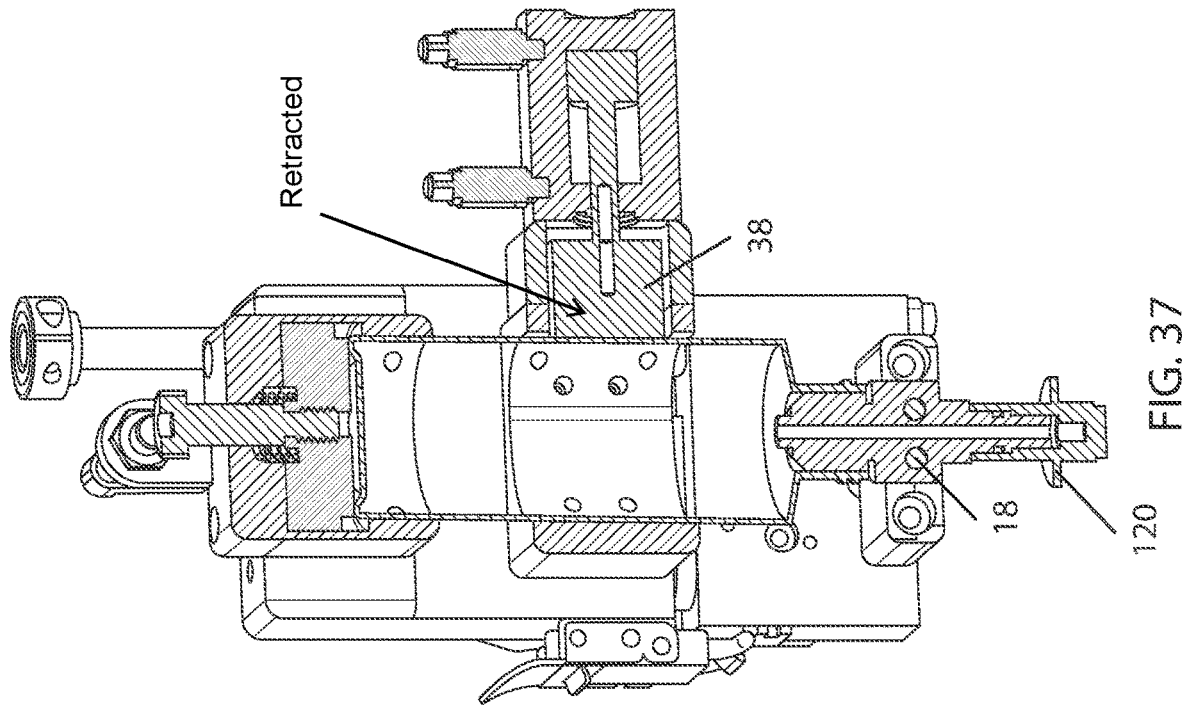
Figure 36:
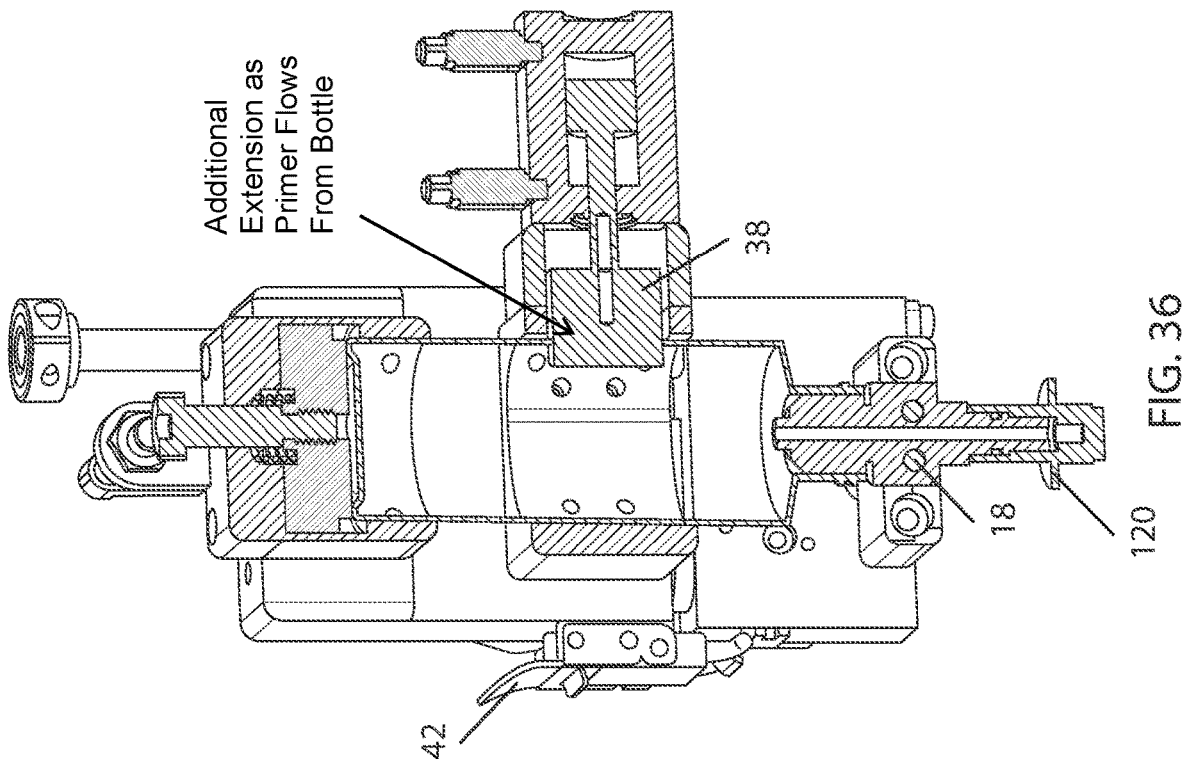

As shown in FIG. 34, when the primer tip is in position at the glass window panel 22, the container squeeze cylinder is in the retracted position at the beginning of cycle, and then the container squeeze cylinder extends to apply pressure at the outer surface of the container 16 to start flow of primer (FIG. 35). As the primer flows, the cylinder will continue to extend, such as to keep the pressure on the container constant (FIG. 36). At the end of the cycle the cylinder retracts again (FIG. 37). This allows the container to return to its original shape and draw in air to replace the dispensed fluid volume so that another cycle can begin.

Thus, the primer head 14 is operable to automatically dispense primer from a squeezable or deformable container 16, which allows the system to be automated for use with primers that are not suitable for the known reservoir and pump systems. The actuator or cylinder 38 of the compressing device 28 is controlled to move an appropriate amount that corresponds with the amount of depression or deformation of the container for dispensing the appropriate amount of primer onto the glass surface. The actuator or cylinder 38 may extend different amounts depending on how full the container is or how the container is deformed.

Figure 39:
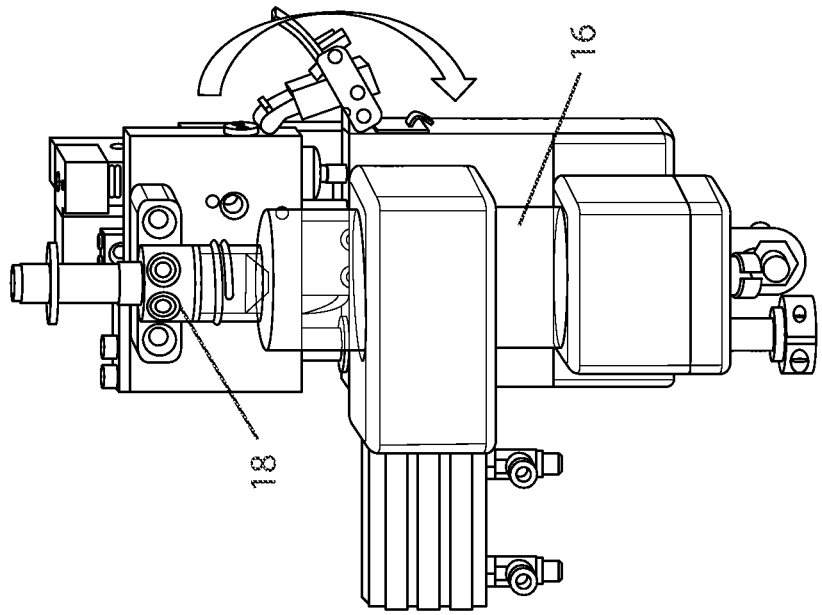
FIGS. 38-47 are views showing how the container is removed and replaced at the device, while the device holds the adapter and tip.
Figure 38:
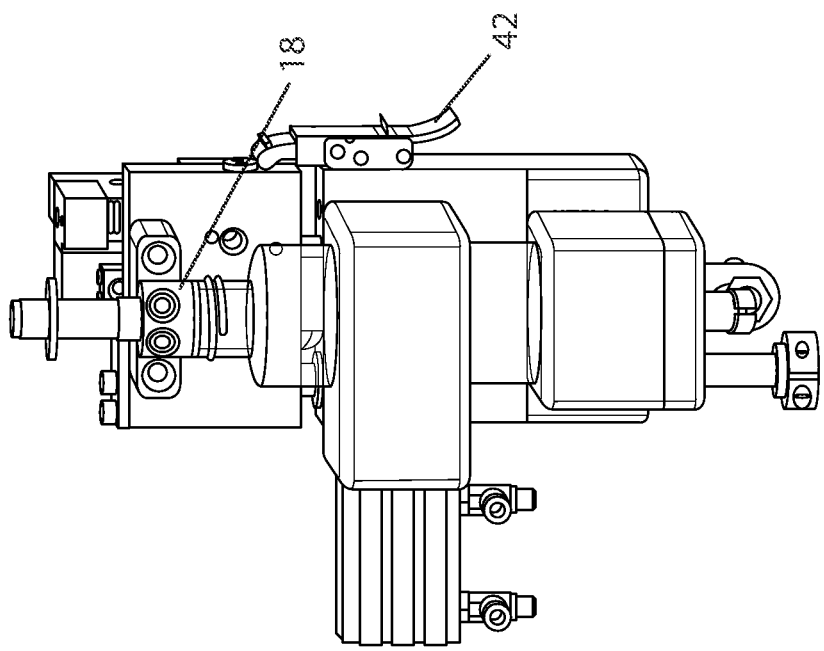
Figure 40:
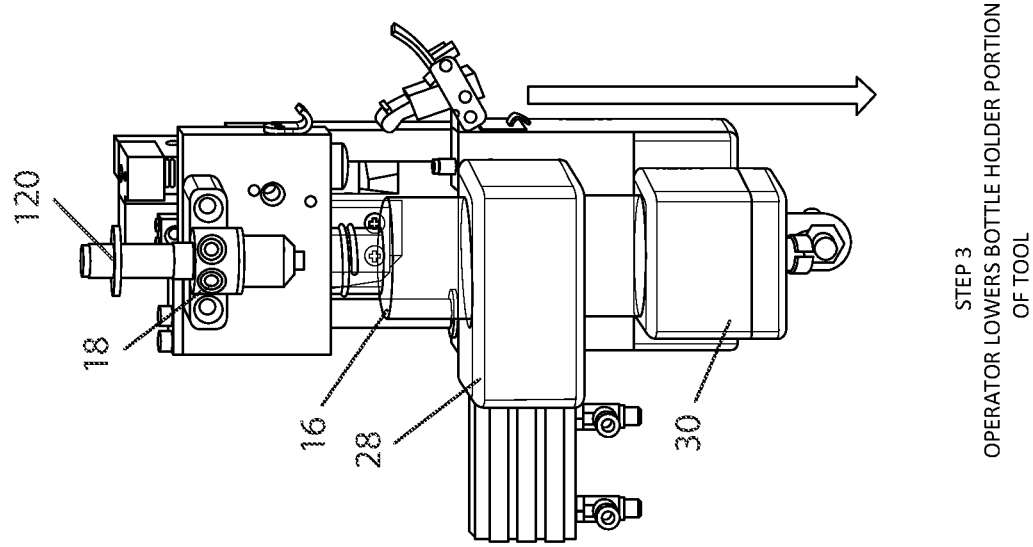
Figure 41:
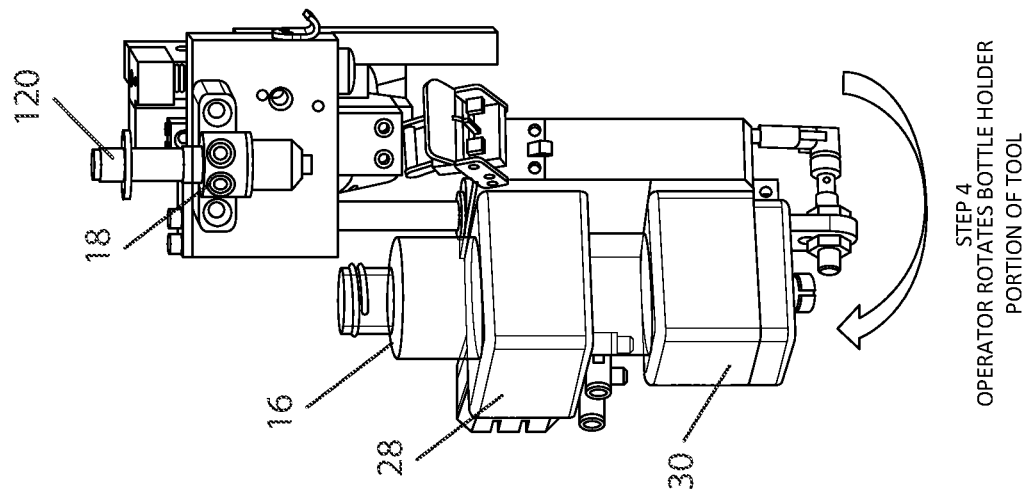
Figure 43:
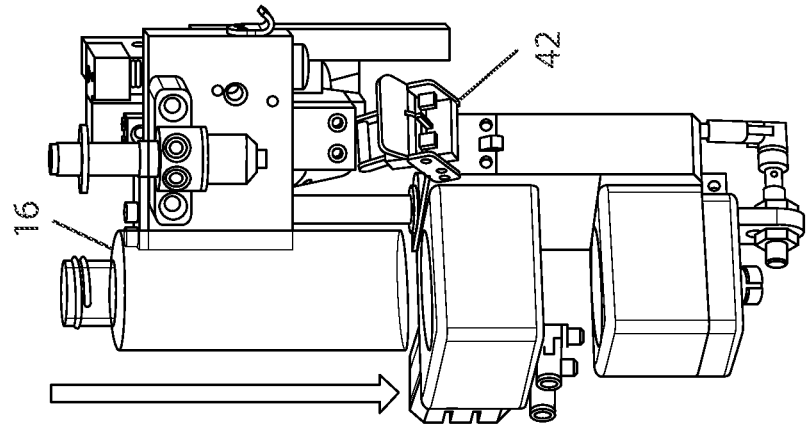
Figure 42:
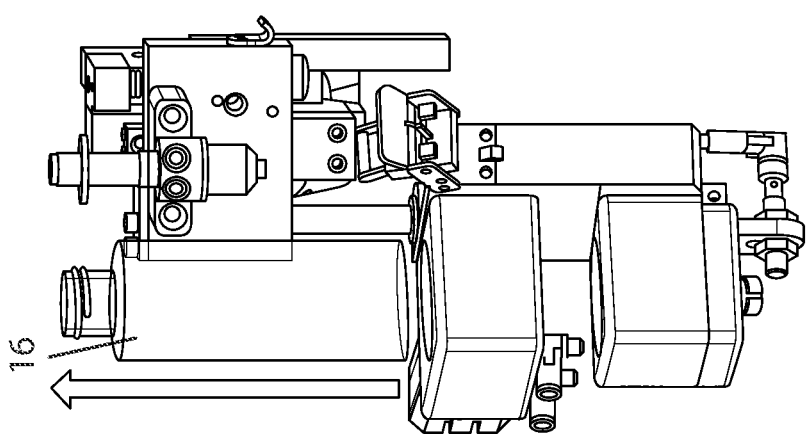
Figure 45:
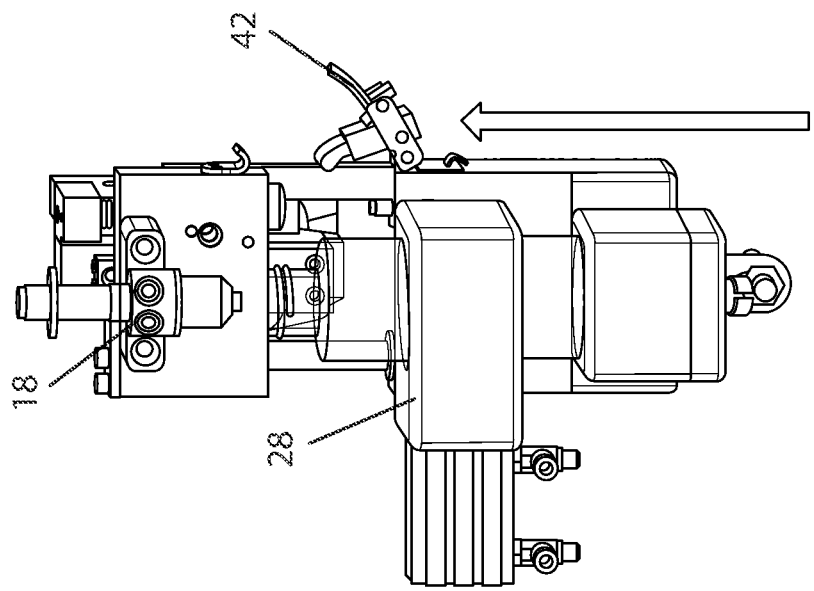
Figure 44:
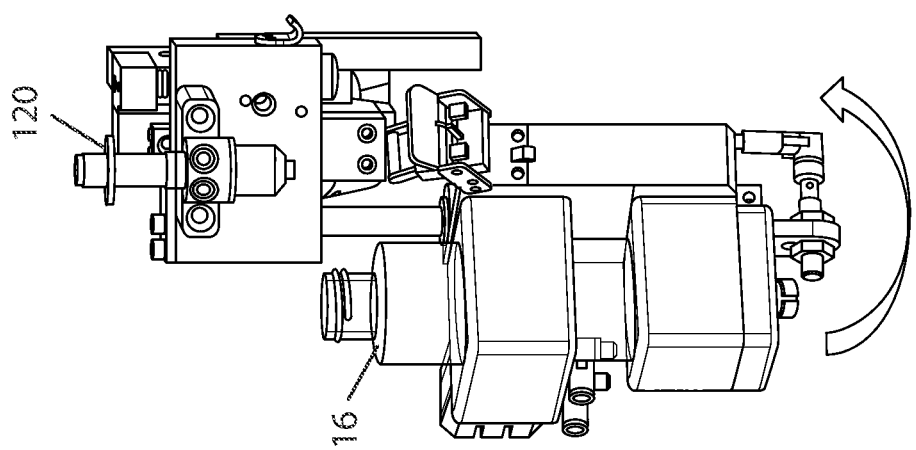
Figure 47:
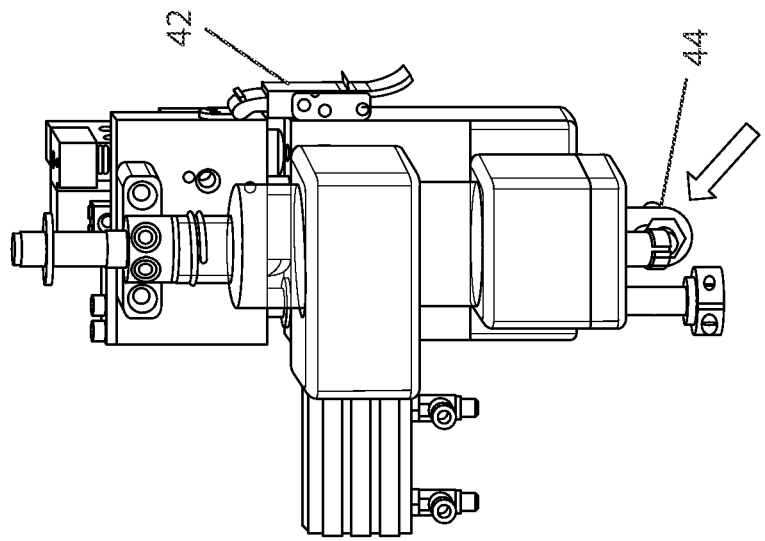
Figure 46:
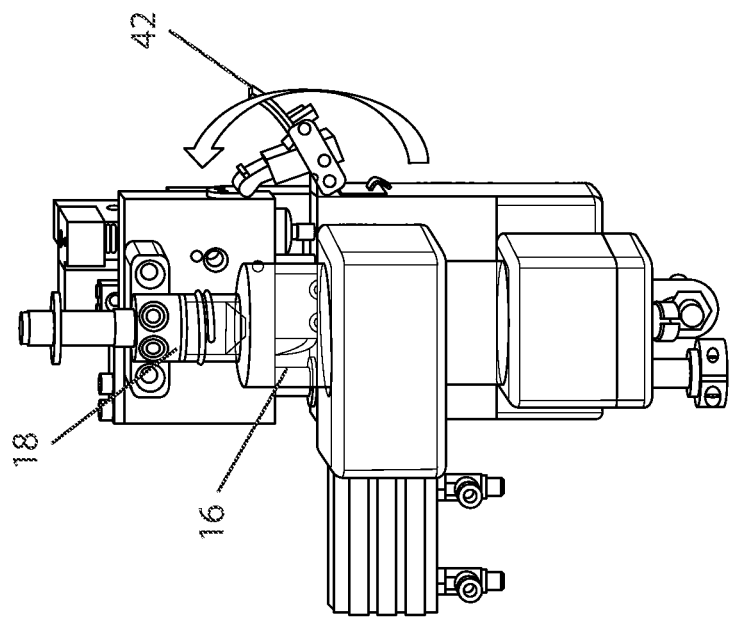

After the container is substantially depleted of its contents (which may be determined by the number of actuations or applications or by a sensor that monitors the amount of primer or fluid remaining in the container), the container can be readily changed to a new container. For example, and such as shown in FIGS. 38-47, when the container needs to be replaced, the robot may move the primer head 14 to a location where the head and container 16 can be accessed by an operator. The primer head 14 may be presented with the primer tip facing or pointing upward (FIG. 38), whereby the operator releases a latch 42 at the primer head 14 (FIG. 39). With the latch 42 released, the container retaining part of the primer head (including the dispensing device 28 and receiving cylinder 30) can move away from the adapter holding part of the primer head, whereby the container 16 is detached from the adapter 18 (FIG. 40). The container holder part can be rotated away from the adapter 18 (FIG. 41) to provide clearance for removing the container 16 from the container holder. The container is then removed from the holder (FIG. 42) and a new container is placed into the container holder (FIG. 43). The container holder (and new container) is then rotated back so that the opening of the container is aligned with the adapter 18 (FIG. 44) and the operator may raise or move the container holder upward to guide the container into engagement with the adapter 18 (FIG. 45). The operator then closes the latch 42 to secure the container holder to the adapter holder with the container seated and sealed at the adapter 18 (FIGS. 46 and 47). After the latch 42 is re-latched, a proximity sensor 44 may determine that the container is present and the device or apparatus may continue operating.

Thus, the system and process provides an adapter that is attached at the primer head and that is received in (not threaded on) the end of the container and locked at the container by latching the adapter holder relative to the container holder. The container holder is part of the tip changing device, so the primer tip can be changed before or after the container is changed. After the container has been changed, and a new primer tip has been attached at the end of the adapter, the primer head moves to rotate the container and to position the container robotically and even squeezes the container robotically, such that the entire process (except for changing the container) is automated.

The system allows for automation of processes that use chemicals/primers that may quickly "spoil" when exposed to air (and thus that are not suitable for use in a typical automated priming system using a pump and reservoir). The adapter remains sealed at the container throughout the process and the changing of the tip is automated and does not require removal of the adapter from the container. The adapter is received in the opening of the container and is not threaded onto the container, and the adapter remains tightly sealed to the container via the latch mechanism and a rubber seal at the adapter-container interface. The system provides an automated container squeezing device for robotically deforming the container for dispensing and applying primer via the container and tip assembly. The tip removal or tip changing system includes a waste container with a drawer slider that allows for automatic disposal of the used tips after they have been removed from the adapter.

The robotic priming work cell can use the same small plastic container (e.g., a plastic container or bottle that holds less than 10 ounces of fluid, or less than 6 ounces of fluid, such as a 4 ounce plastic container or bottle) that is used to hand apply primers. The tooling for both the primer tip containment and the container containment and dispense pressure control mimic the manual control process of hand applying the primers, but do so in a fully automated manner. The work cell may process two pair of glass panels (one molding cycle) per each primer operation cycle. Each panel of glass is primed with a dedicated robot while a third robot is used to maneuver the glass from one surface to the other as the priming paths vary from each surface (Class A—out/Class C—inside). The primer tips are fed into an escapement type auto tip changer that allows the primer robots to automatically extract the used tip and load a fresh one. The primer containers are manually replaced by the operator. Flag conditions for requesting a container change are time, number of cycles and/or several consecutive primer vision faults or failed tip wetness checks which occur after a tip change.

The robotic priming work cell or system or process thus provides for a reduction in labor, and provides for more constant or consistent prime paths that can be verified with an inspection system. The system has the ability to control the amount of primer used and when it is replaced, which greatly reduces the amount of waste and the potential to use expired primer or produce parts with expired priming tips. The tip waste is automatically collected in an approved hazardous waste container. The usage of the primer tips can be tracked. The automated system also reduces or minimizes the exposure of the operator to chemicals. Glass priming does not score well on an ergonomic assessment due to excessive repetition and posture issues, so the robotic priming system greatly reduces adverse ergonomic conditions to the production personnel. The system also provides for custom automation on a common base that allows the work cell to be moved without having to be dismantled.

The system thus provides a custom primer tip to container adaptor to secure the primer tip from the tip changer and to provide a minimal fixed portion of the primer system that needs to be cleaned and maintained on a regular basis. The container interface portion of the adaptor is designed to seal on and in the end of the thread opening of the container thus eliminating the need to screw the primer container to the priming head. The custom primer tip adapter plug is inserted in the container and attached at the primer head when idle. The plug is produced out of a urethane material and is tapered to create an interference fit as it is pushed/pulled in to the tip. This eliminates any material from drying inside the opening.

The custom primer head dispenses chemicals out of a small plastic container (such as a plastic container or bottle that holds less than 10 ounces of fluid, or that holds less than 6 ounces of fluid, such as a 4 ounce plastic container or bottle or the like) via a controlled container compressing or container deforming device that provides enhanced control of the dispensing of the primer onto the glass panels. The automated waste container is mounted at a drawer slider so that it can be serviced without having to enter the robot work cell. The system may provide custom tooling utilizing a fixture for holding the glass during the priming process (such as a CNC cut Ertalite or Cass-Polymers fixture) and to provide a high wear surface that will not scratch the glass during the fixturing and priming processes.

Changes and modifications in the specifically described embodiments may be carried out without departing from the principles of the present invention, which is intended to be limited only by the scope of the appended claims as interpreted according to the principles of patent law.

The invention claimed is:

1. A system for automatically dispensing a fluid from a container onto a panel, the system comprising: a primer head comprising a container receiver and a container deformer, the container receiver receiving and holding the container thereat, wherein the container is a deformable container of a primer;

an adapter comprising (i) a first portion that is received into an opening of the container and at least partially within the container and (ii) a second portion that is secured to a portion of the primer head, wherein, with the first portion received into the opening of the container and at least partially within the container, the second portion is at least partially exterior of the container, and wherein, with the first portion of the adapter received into the opening of the container, and with the second portion of the adapter secured to the portion of the primer head, the container is retained at the container receiver of the primer head;

wherein a primer tip is disposed at the adapter;

wherein, with the container received in and held at the container receiver and retained at the primer head, and with the adapter secured to the portion of the primer head, the primer head moves to position the primer tip at the panel;

wherein, when the primer tip is positioned at the panel, the container deformer automatically operates to deform the container to cause a predetermined amount of the primer to be dispensed from the container, through the adapter and to the primer tip and onto the panel; and wherein the primer tip comprises: a disposable primer tip, and wherein the system comprises a tip changing device configured to automatically remove and install disposable primer tips at the adapter, and wherein the tip changing device comprises (i) a slotted plate for engaging and removing the disposable primer tips, (ii) a tip installing portion for installing the disposable primer tips at the adapter and (iii) an air slide for adjusting a position of the slotted plate and the tip installing portion when removing and installing the disposable primer tips.

2. The system of claim 1, wherein the system robotically moves the primer head to position the primer tip at the panel and, when the primer tip is positioned at the panel, automatically operates and controls the container deformer to dispense the predetermined amount of the primer from the container.

3. The system of claim 1, wherein the container deformer comprises an actuator that, when the container deformer automatically operates to deform the container, moves a deforming element into engagement with the container to deform the container.

4. The system of claim 3, wherein the container receiver is formed to provide clearance at locations around the container to allow the container to deform when the deforming element is moved further toward and into engagement with the container to deform the container.

5. The system of claim 1, wherein the primer head is operable to remove the container via actuation of a latch mechanism to disengage the container receiver from the portion of the primer head that has the second portion of the adapter secured thereto.

6. The system of claim 5, wherein, with the latch mechanism actuated to release a latch, the container receiver is movable away from the adapter to allow for removal and replacement of the container.

7. The system of claim 1, wherein the container comprises a deformable bottle.

8. The system of claim 7, wherein the deformable bottle is configured to hold less than or equal to six ounces of fluid.

9. The system of claim 1, wherein the primer tip is disposed at the adapter so that an internal channel of the primer tip is in fluid communication with the container via the adapter.

10. The system of claim 9, wherein the primer tip comprises a spreader at an end of the primer tip, and wherein, when the primer is dispensed onto the panel, the primer flows through the internal channel to the spreader and onto the panel.

11. The system of claim 10, wherein the spreader comprises a felt pad.

12. A system for automatically dispensing a fluid from container onto a panel, the system comprising: a primer head comprising a container receiver and a container deformer, the container receiver receiving and holding the container thereat, wherein the container is a deformable container of a primer;

an adapter comprising (i) a first portion that is received into an opening of the container and at least partially within the container and (ii) a second portion that is secured to a portion of the primer head, wherein, with the first portion received into the opening of the container and at least partially within the container, the second portion is at least partially exterior of the container, and wherein, with the first portion of the adapter received into the opening of the container, and with the second portion of the adapter secured to the portion of the primer head, the container is retained at the container receiver of the primer head;

wherein a primer tip is disposed at the adapter, the primer tip comprising an internal channel and a spreader at an end of the primer tip;

wherein, with the container received in and held at the container receiver and retained at the primer head, and with the adapter secured to the portion of the primer head, the primer head moves to position the primer tip at the panel so that the internal channel of the primer tip is in fluid communication with the container via the adapter;

wherein the container deformer comprises an actuator that, when the container deformer operates, moves a deforming element into engagement with the container to deform the container; and wherein the system robotically moves the primer head to position the primer tip at the panel and, when the primer tip is positioned at the panel, the container deformer automatically operates and controls the container deformer to move the deforming element into engagement with the container to deform the container to dispense a predetermined amount of the primer from the container, through the adapter, through the internal channel of the primer tip and to the spreader of the primer tip and onto the panel; and wherein the primer tip comprises a disposable primer tip, and wherein the system comprises a tip changing device configured to automatically remove and install disposable primer tips at the adapter, and wherein the tip changing device comprises: (i) a slotted plate for engaging and removing the disposable primer tips, (ii) a tip installing portion for installing the disposable primer tips at the adapter and (iii) an air slide for adjusting a position of the slotted plate and the tip installing portion when removing and installing the disposable primer tips.

13. The system of claim 12, wherein the container receiver is formed to provide clearance at locations around the container to allow the container to deform when the deforming element is moved further toward and into engagement with the container to deform the container.

14. The system of claim 12, wherein the primer head is operable to remove the container via actuation of a latch mechanism to disengage the container receiver from the portion of the primer head that has the second portion of the adapter secured thereto, and wherein, with the latch mechanism actuated to release a latch, the container receiver is movable away from the adapter to allow for removal and replacement of the container.

15. The system of claim 12, wherein the spreader comprises a felt pad.

16. The system of claim 12, wherein, as the container deformer operates to deform the container, the actuator extends the deforming element toward an outer surface of the container to compress the container between the deforming element and the container receiver.

17. The system of claim 12, wherein the first portion of the adapter comprises a first end of the adapter, and wherein the primer tip is disposed at a second end of the adapter that is opposite the first end.

18. The system of claim 17, wherein the adapter comprises a fluid channel that extends between the first end and the second end of the adapter to fluidly connect the container and internal channel of the primer tip.

19. The system of claim 1, wherein, as the container deformer operates to deform the container, the container deformer extends toward an outer surface of the container to compress the container between the container deformer and the container receiver.

20. The system of claim 1, wherein the first portion of the adapter comprises a first end of the adapter, and wherein the primer tip is disposed at a second end of the adapter that is opposite the first end.

21. The system of claim 20, wherein the adapter comprises a fluid channel that extends between the first end and the second end of the adapter to fluidly connect the container and the primer tip.

* * * * *